United States Patent
Hyun et al.

(10) Patent No.: US 9,933,950 B2
(45) Date of Patent: Apr. 3, 2018

(54) STORAGE OPERATION INTERRUPT

(71) Applicant: SanDisk Technologies, Inc., Plano, TX (US)

(72) Inventors: Jea Hyun, Los Altos, CA (US); James Peterson, San Jose, CA (US); Long Pham, San Ramon, CA (US); John Strasser, Kaysville, UT (US); Hairong Sun, Superior, CO (US); Kapil Verma, San Jose, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/656,345

(22) Filed: Mar. 12, 2015

(65) Prior Publication Data

US 2016/0210050 A1   Jul. 21, 2016

Related U.S. Application Data

(60) Provisional application No. 62/104,579, filed on Jan. 16, 2015.

(51) Int. Cl.
  *G06F 3/00* (2006.01)
  *G06F 3/06* (2006.01)

(52) U.S. Cl.
  CPC ............ *G06F 3/0611* (2013.01); *G06F 3/067* (2013.01); *G06F 3/0659* (2013.01); *G06F 3/0688* (2013.01)

(58) Field of Classification Search
  CPC ........ G06F 3/06; G06F 3/0604; G06F 3/0653; G06F 3/0679
  See application file for complete search history.

(56) References Cited

U.S. PATENT DOCUMENTS

| | | | |
|---|---|---|---|
| 4,980,861 A | 12/1990 | Herdt et al. | |
| 5,742,787 A | 4/1998 | Talreja | |
| 5,799,200 A | 8/1998 | Brant et al. | |
| 5,805,501 A | 9/1998 | Shiau et al. | |
| 5,867,430 A | 2/1999 | Chen et al. | |
| 6,278,633 B1 | 8/2001 | Wong et al. | |
| 6,336,174 B1 | 1/2002 | Li et al. | |
| 6,404,647 B1 | 6/2002 | Minne | |
| 6,412,080 B1 | 6/2002 | Fleming et al. | |
| 6,515,909 B1 | 2/2003 | Wooldridge | |

(Continued)

FOREIGN PATENT DOCUMENTS

| | | |
|---|---|---|
| GB | 0123416.0 | 9/2001 |
| WO | 2010053756 | 5/2010 |

OTHER PUBLICATIONS

U.S. Appl. No. 13/800,628, 2380.2.147, Office Action, dated Dec. 5, 2014.

(Continued)

*Primary Examiner* — David X Yi
*Assistant Examiner* — Craig Goldschmidt
(74) *Attorney, Agent, or Firm* — Kunzler, PC

(57) ABSTRACT

Apparatuses, systems, methods, and computer program products are disclosed for interrupting storage operations. A frequency module is configured to determine a frequency for pausing a storage operation. An interrupt module is configured to pause execution of a storage operation according to a determined frequency. A resume module is configured to continue a paused storage operation in response to a trigger.

20 Claims, 7 Drawing Sheets

(56) References Cited

U.S. PATENT DOCUMENTS

| | | |
|---|---|---|
| 6,515,928 B2 | 2/2003 | Sato et al. |
| 6,535,546 B1 | 3/2003 | Bethscheider et al. |
| 6,552,955 B1 | 4/2003 | Miki |
| 6,587,937 B1 | 7/2003 | Jensen et al. |
| 6,608,793 B2 | 8/2003 | Park et al. |
| 6,633,950 B1 | 10/2003 | Brown et al. |
| 6,633,956 B1 | 10/2003 | Mitani |
| 6,643,181 B2 | 11/2003 | Sofer et al. |
| 6,745,284 B1* | 6/2004 | Lee ................. G06F 3/0613 711/112 |
| 6,751,155 B2 | 6/2004 | Gorobets |
| 6,760,806 B2 | 7/2004 | Jeon |
| 6,845,053 B2 | 1/2005 | Chevallier |
| 6,849,480 B1 | 2/2005 | Low et al. |
| 6,871,257 B2 | 3/2005 | Conley et al. |
| 6,883,044 B1 | 4/2005 | Roohparvar |
| 6,887,058 B2 | 5/2005 | Fujiwara |
| 6,920,522 B2 | 7/2005 | Roohparvar |
| 6,977,847 B2 | 12/2005 | Lasser et al. |
| 7,042,664 B2 | 5/2006 | Gill et al. |
| 7,057,936 B2 | 6/2006 | Yaegashi et al. |
| 7,064,994 B1 | 7/2006 | Wu |
| 7,080,193 B2 | 7/2006 | Rooparvar |
| 7,107,480 B1 | 9/2006 | Moshayedi et al. |
| 7,167,944 B1 | 1/2007 | Estakhri |
| 7,177,197 B2 | 2/2007 | Cernea |
| 7,215,580 B2 | 5/2007 | Gorobets |
| 7,227,777 B2 | 6/2007 | Roohparvar |
| 7,257,129 B2 | 8/2007 | Lee et al. |
| 7,263,591 B2 | 8/2007 | Estakhri et al. |
| 7,340,558 B2 | 3/2008 | Lee et al. |
| 7,340,581 B2 | 3/2008 | Gorobets et al. |
| 7,400,537 B2 | 7/2008 | Hemink et al. |
| 7,403,424 B2 | 7/2008 | Hemink et al. |
| 7,424,593 B2 | 9/2008 | Estakhri et al. |
| 7,441,090 B2 | 10/2008 | Estakhri et al. |
| 7,451,344 B1 | 11/2008 | Rothberg |
| 7,457,166 B2 | 11/2008 | Hemink et al. |
| 7,460,432 B2 | 12/2008 | Warner |
| 7,463,521 B2 | 12/2008 | Li |
| 7,463,532 B2 | 12/2008 | Tran et al. |
| 7,480,766 B2 | 1/2009 | Gorobets |
| 7,495,954 B2 | 2/2009 | Ito |
| 7,499,317 B2 | 3/2009 | Ito |
| 7,499,338 B2 | 3/2009 | Ito |
| 7,522,457 B2 | 4/2009 | Hemink et al. |
| 7,529,905 B2 | 5/2009 | Sinclair |
| 7,535,766 B2 | 5/2009 | Ito |
| 7,630,255 B2 | 12/2009 | Yang |
| 7,631,138 B2 | 12/2009 | Gonzalez et al. |
| 7,777,652 B2 | 8/2010 | Lee et al. |
| 7,856,528 B1 | 12/2010 | Frost et al. |
| 7,908,501 B2 | 3/2011 | Kim et al. |
| 7,930,589 B2 | 4/2011 | Lavastre et al. |
| 7,944,762 B2 | 5/2011 | Gorobets |
| 8,001,334 B2 | 8/2011 | Lee |
| 8,055,922 B2 | 11/2011 | Brittain et al. |
| 8,130,551 B2 | 3/2012 | Oowada et al. |
| 8,289,801 B2 | 10/2012 | Smith et al. |
| 8,364,888 B2 | 1/2013 | Melik-Martirosian et al. |
| 8,429,436 B2 | 4/2013 | Fillingim et al. |
| 8,972,627 B2 | 3/2015 | Strasser et al. |
| 9,021,158 B2 | 4/2015 | Hyun et al. |
| 9,042,181 B2 | 5/2015 | Flynn et al. |
| 9,223,514 B2* | 12/2015 | Hyun ................. G11C 16/225 |
| 9,666,244 B2 | 5/2017 | Hyun et al. |
| 2002/0066047 A1 | 5/2002 | Olarig et al. |
| 2002/0199056 A1 | 12/2002 | Ayukawa et al. |
| 2003/0115405 A1 | 6/2003 | Funyu et al. |
| 2003/0126475 A1 | 7/2003 | Bodas |
| 2003/0145230 A1 | 7/2003 | Chui et al. |
| 2003/0163630 A1 | 8/2003 | Aasheim et al. |
| 2003/0163663 A1 | 8/2003 | Aasheim et al. |
| 2003/0210601 A1 | 11/2003 | Lin et al. |
| 2004/0003002 A1 | 1/2004 | Adelmann |
| 2004/0003167 A1 | 1/2004 | Kimura et al. |
| 2004/0057288 A1 | 3/2004 | Kawabata |
| 2004/0064647 A1 | 4/2004 | Dewhitt et al. |
| 2004/0114431 A1 | 6/2004 | Shona |
| 2004/0148360 A1 | 7/2004 | Mehra et al. |
| 2004/0177054 A1 | 9/2004 | Stern et al. |
| 2004/0186946 A1 | 9/2004 | Lee |
| 2004/0225719 A1 | 11/2004 | Kisley et al. |
| 2005/0018527 A1 | 1/2005 | Gorobets |
| 2005/0210323 A1 | 9/2005 | Batchelor et al. |
| 2005/0246558 A1 | 11/2005 | Ku |
| 2006/0053247 A1* | 3/2006 | Cheung ................. G11C 16/16 711/103 |
| 2006/0059326 A1 | 3/2006 | Aasheim |
| 2006/0106990 A1 | 5/2006 | Benhase et al. |
| 2006/0149916 A1 | 7/2006 | Nase |
| 2006/0184736 A1 | 8/2006 | Benhase et al. |
| 2006/0230295 A1 | 10/2006 | Schumacher et al. |
| 2006/0265624 A1 | 11/2006 | Moshayedi |
| 2007/0168698 A1 | 7/2007 | Coulson et al. |
| 2007/0204270 A1 | 8/2007 | Shin |
| 2007/0230253 A1 | 10/2007 | Kim |
| 2007/0233938 A1 | 10/2007 | Cho et al. |
| 2007/0234021 A1 | 10/2007 | Ruberg et al. |
| 2007/0239926 A1 | 10/2007 | Gyl et al. |
| 2007/0245094 A1 | 10/2007 | Lee et al. |
| 2007/0274150 A1 | 11/2007 | Gorobets |
| 2008/0037330 A1 | 2/2008 | Park et al. |
| 2008/0052483 A1 | 2/2008 | Rangarajan et al. |
| 2008/0059820 A1 | 3/2008 | Vaden et al. |
| 2008/0080243 A1 | 4/2008 | Edahiro et al. |
| 2008/0104344 A1 | 5/2008 | Shimozono et al. |
| 2008/0117686 A1 | 5/2008 | Yamada |
| 2008/0126686 A1 | 5/2008 | Sokolov et al. |
| 2008/0266973 A1 | 10/2008 | Sekar et al. |
| 2008/0282031 A1 | 11/2008 | Tanoue |
| 2008/0301475 A1 | 12/2008 | Felter et al. |
| 2008/0320323 A1 | 12/2008 | Brittain et al. |
| 2009/0037778 A1 | 2/2009 | Resnick |
| 2009/0091979 A1 | 4/2009 | Shalvi |
| 2009/0091996 A1 | 4/2009 | Chen et al. |
| 2009/0150621 A1 | 6/2009 | Lee |
| 2009/0157989 A1 | 6/2009 | Karamcheti et al. |
| 2009/0193183 A1 | 7/2009 | Kudo et al. |
| 2009/0239468 A1 | 9/2009 | He et al. |
| 2010/0049913 A1 | 2/2010 | Marcu et al. |
| 2010/0067306 A1 | 3/2010 | Hwang |
| 2010/0102999 A1 | 4/2010 | Lee et al. |
| 2010/0106917 A1 | 4/2010 | Ruberg et al. |
| 2010/0110798 A1 | 5/2010 | Hoei et al. |
| 2010/0153680 A1 | 6/2010 | Baum et al. |
| 2010/0257304 A1 | 10/2010 | Rajan et al. |
| 2010/0262738 A1 | 10/2010 | Swing et al. |
| 2010/0262740 A1 | 10/2010 | Borchers et al. |
| 2010/0262757 A1 | 10/2010 | Sprinkle et al. |
| 2010/0262758 A1 | 10/2010 | Swing et al. |
| 2010/0262759 A1 | 10/2010 | Borchers et al. |
| 2010/0262760 A1 | 10/2010 | Swing et al. |
| 2010/0262761 A1 | 10/2010 | Borchers et al. |
| 2010/0262762 A1 | 10/2010 | Borchers et al. |
| 2010/0262766 A1 | 10/2010 | Sprinkle et al. |
| 2010/0262767 A1 | 10/2010 | Borchers et al. |
| 2010/0262773 A1 | 10/2010 | Borchers et al. |
| 2010/0262894 A1 | 10/2010 | Swing et al. |
| 2010/0262979 A1 | 10/2010 | Borchers et al. |
| 2010/0268974 A1 | 10/2010 | Floyd et al. |
| 2010/0287217 A1 | 11/2010 | Borchers et al. |
| 2010/0332871 A1 | 12/2010 | Allalouf et al. |
| 2011/0157992 A1 | 6/2011 | Strasser et al. |
| 2011/0208911 A1 | 8/2011 | Taguchi et al. |
| 2012/0239868 A1 | 9/2012 | Ryan |
| 2012/0254515 A1* | 10/2012 | Melik-Martirosian ........... G11C 16/14 711/103 |
| 2013/0318285 A1* | 11/2013 | Pignatelli ........ G06F 12/0246 711/103 |
| 2014/0003156 A1 | 1/2014 | He |

(56) References Cited

U.S. PATENT DOCUMENTS

2014/0215175 A1 7/2014 Kasorla et al.
2015/0248922 A1 9/2015 Hyun et al.

OTHER PUBLICATIONS

"Am29DL322D/323D/324D", Spansion, Oct. 7, 2004, pp. 57, Publication No. 21534, Revision D, Amendment +7.
Application No. PCT/US2012/024927, 2380.2.62PCT, International Search Report and Written Opinion, dated Oct. 12, 2012.
Leventhal, Adam, "Flash Storage Memory", Communications of the ACM, Jul. 2008, pp. 5, vol. 61, No. 7.
U.S. Appl. No. 13/372,430, 2380.2.62, Notice of Allowance, dated Nov. 3, 2014.
U.S. Appl. No. 13/834,955, 2380.2.149 Notice of Allowance, dated Jan. 12, 2015.
Shibata, Noboru, 19nm 112.8mm2 64Gb Multi-level Flash Memory with 400Mb/s/pin 1.8V Toggle Mode Interface, Flash Memory Summit, 2012, pp. 21 and 23, Santa Clara, California.
2380.2.126pct, PCT/US2015/017804, International Search Report, dated May 26, 2015.
Agrawal et al., "ECC and Signal Processing Technology for Solid State Drives and Multi-bit per cell NAND Flash Memories" Forward Insights, Report No. FI-NFL-FSP-0110, (Jan. 2010), 174 pages.
2380.2.34PCT1, PCT/US2010/048321, International Search Report, dated Apr. 28, 2011.
2380.2.34PCT2, PCT/US2010/048320, International Search Report, dated Apr. 28, 2011.
U.S. Appl. No. 13/800,628, 2380.2.147, Notice of Allowance, dated Aug. 18, 2015.
U.S. Appl. No. 13/800,628, 2380.2.147, Office Action, dated Apr. 2, 2014.
Application No. PCT/US2012/024927, 2380.2.62PCT, International Preliminary Report on Patentability, dated Aug. 13, 2013.
U.S. Appl. No. 14/297,622, 2380.2.126, Office Action, dated Feb. 16, 2016.
U.S. Appl. No. 13/834,955, 2380.2.149 Office Action, dated Apr. 4, 2014.
U.S. Appl. No. 13/834,955, 2380.2.149 Final Office Action, dated Sep. 8, 2014.
U.S. Appl. No. 13/372,430, 2380.2.62, Office Action, dated Nov. 7, 2013.
U.S. Appl. No. 13/372,430, 2380.2.62, Final Office Action, dated Apr. 21, 2014.
U.S. Appl. No. 12/878,987, 2380.2.34US2, Office Action, dated Oct. 18, 2012.
U.S. Appl. No. 12/878,987, 2380.2.34US2, Notice of Allowance, dated Mar. 21, 2013.
U.S. Appl. No. 13/837,818, 2380.2.93, Office Action, dated Sep. 24, 2014.
U.S. Appl. No. 13/837,818, 2380.2.93, Notice of Allowance, dated Jan. 22, 2015.
U.S. Appl. No. 13/800,628, 2380.2.147, Final Office Action, dated May 5, 2015.
U.S. Appl. No. 13/800,628, 2380.2.147, Final Office Action, dated Aug. 7, 2014.
2380.2.34PCT1, PCT/US2010/048321, International Preliminary Report on Patentability, dated Mar. 22, 2012.
2380.2.34PCT2, PCT/US2010/048320, International Preliminary Report on Patentability, dated Mar. 22, 2012.
Application No. PCT/US2015/017804, 2380.2.126PCT, International Search Report and Written Opinion, dated May 26, 2015.
Application No. 10816108.4, 2380.2.34EP, Office Action, dated Sep. 30, 2015.
PCT/US2015/017804 (2380.2.126pct) International Preliminary Report on Patentability dated Sep. 15, 2016.
U.S. Appl. No. 14/297,622 Final Rejection dated Aug. 15, 2016.
U.S. Appl. No. 14/297,622 Notice of Allowance dated Jan. 27, 2017.
U.S. Appl. No. 14/297,622 Corrected Notice of Allowability dated Mar. 16, 2017.

* cited by examiner

FIG. 5

STORAGE OPERATION INTERRUPT

CROSS-REFERENCES TO RELATED APPLICATIONS

This application claims the benefit of U.S. Provisional Patent Application No. 62/104,579 entitled "STORAGE OPERATION INTERRUPT" and filed on Jan. 16, 2015, for Jea Hyun, et al., which is incorporated herein by reference.

TECHNICAL FIELD

The present disclosure, in various embodiments, relates to interrupting a storage operation and more particularly relates to periodically interrupting a storage operation at a storage element.

BACKGROUND

Solid-state storage, such as NAND flash memory, stores data in arrays of storage cells, which, in the case of flash memory, are formed from floating-gate transistors. NAND flash memory devices return previously stored data by reading a set of bits from cells in an array. The time required to erase data from a cell is typically longer than the time required to write data to a cell and typically much longer than the time required to read data from a cell. As sizes for memory elements continue to decrease, erase times and write times continue to increase at a faster rate than read times.

Read operations typically occur for small sets of memory cells, program operations typically occur for the same or larger sets of memory cells than read operations, and erase operations typically occur for even larger sets of memory cells. Many flash memory devices are designed to keep read times as low as possible to allow very fast access to the data stored at the memory cells. Write/program times are typically longer than read times, but shorter than erase times.

A memory device may include one or more chips, and a chip may include one or more arrays of memory cells. While a storage operation is being performed for a given set of cells, other access to the chip on which the cells are located may be blocked, including reading data stored in other cells on the same chip or writing data to a block of cells on the same chip. As a result, an application requesting access to a given cell or group of cells for a read operation may not be able perform the read operation for some time if an erase or program operation is being performed at the chip on which the given cell is located.

SUMMARY

Methods are presented for interrupting storage operations. In one embodiment, a method includes receiving, at a storage element, an indicator of how often a storage operation is to be interrupted. A method, in a further embodiment, includes interrupting execution of a storage operation on a storage element one or more times based on an indicator. In certain embodiments, a method includes executing one or more other storage operations on a storage element while a storage operation is interrupted.

Apparatuses are presented to interrupt storage operations. In one embodiment, a frequency module is configured to determine a frequency for pausing a storage operation. An interrupt module, in certain embodiments, is configured to pause execution of a storage operation according to a determined frequency. A resume module, in a further embodiment, is configured to continue a paused storage operation in response to a trigger.

Systems are presented to interrupt storage operations. A system, in one embodiment, includes a plurality of data recording elements. A controller for a plurality of data recording elements, in certain embodiments, monitors a workload of storage requests for data recording elements. In a further embodiment, a controller determines a number of segments of a storage operation to execute before checking for insertable storage operations based on a monitored workload. A controller, in one embodiment, checks for insertable storage operations for one or more data recording elements based on a determined number of segments.

BRIEF DESCRIPTION OF THE DRAWINGS

A more particular description is included below with reference to specific embodiments illustrated in the appended drawings. Understanding that these drawings depict only certain embodiments of the disclosure and are not therefore to be considered to be limiting of its scope, the disclosure is described and explained with additional specificity and detail through the use of the accompanying drawings, in which:

FIG. 5 is a block diagram illustrating one embodiment of storage operations;

DETAILED DESCRIPTION

Figure 1:
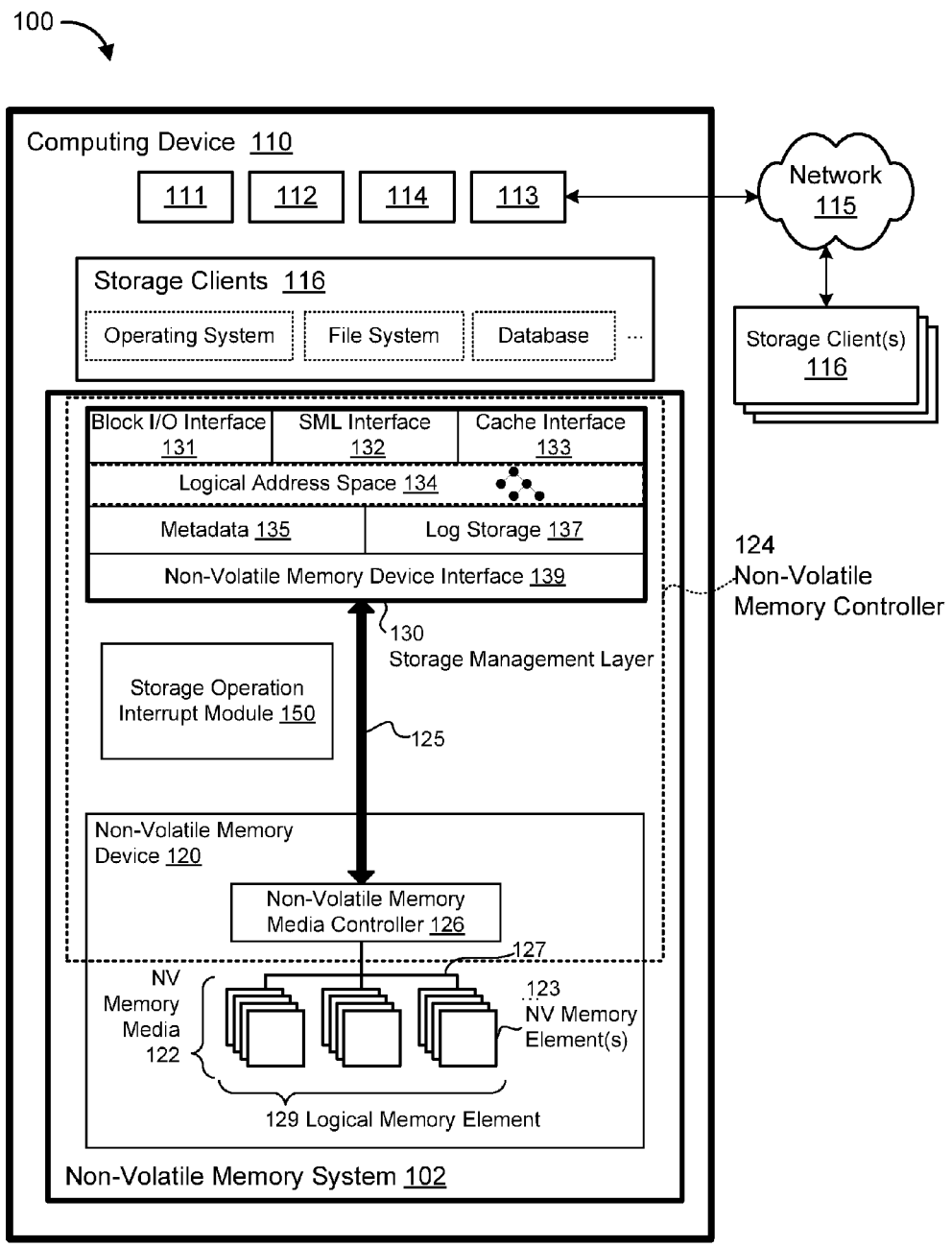
FIG. 1 is a schematic block diagram of one embodiment of a system comprising a storage operation interrupt module for interrupting storage operations.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "circuit," "module," "apparatus," or "system." Furthermore, aspects of the present disclosure may take the form of a computer program product embodied in one or more non-transitory computer readable storage media storing computer readable and/or executable program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

FIG. 1 is a block diagram of one embodiment of a system 100 comprising a storage operation interrupt module 150. The storage operation interrupt module 150 may be part of and/or in communication with one or more of a non-volatile memory controller 124, a non-volatile memory media controller 126, a device driver, or storage management layer (SML) 130, or the like. The storage operation interrupt module 150 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 and/or non-volatile memory controller 124 to a communication network 115, such as an Internet Protocol network, a Storage Area Network, or the like.

The computing device 110 may further comprise a non-transitory, computer readable storage media 114. The computer readable storage media 114 may comprise executable instructions configured to cause the computing device 110 (e.g., processor 111) to perform steps of one or more of the methods disclosed herein. Alternatively, or in addition, the storage operation interrupt module 150 may be embodied as one or more computer readable instructions stored on the non-transitory storage media 114.

The non-volatile memory system 102, in the depicted embodiment, includes a storage operation interrupt module 150. The storage operation interrupt module 150, in one embodiment, is configured to determine a frequency for interrupting a storage operation (e.g., an erase operation, a program operation, or the like), interrupt execution of the storage operation according to the determined frequency, and resume the interrupted storage operation in response to a trigger. In one embodiment, the storage operation interrupt module 150 checks for insertable storage operations (e.g., read operations) while another storage operation is interrupted and executes one or more insertable storage operations on the same storage element 123 as the interrupted storage operation while the storage operation is interrupted and automatically resumes the interrupted storage operation if no insertable storage operation is present in the operation queue.

Thus, in certain embodiments, the storage operation interrupt module 150 permits a pending operation of shorter duration (e.g. a read operation) to occur on the same die as an erase block where a storage operation of longer duration (e.g. an erase operation, a program operation, or the like) is being executed. The storage operation interrupt module 150 may accomplish this by breaking up or interrupting a longer storage operation and allowing other storage operations to be performed on the same die of an erase block between segments of the longer storage operation. The division of the longer storage operation into segments that may complete in a known timeframe, in one embodiment, permits the latency of operations to be predictable and controllable.

In one embodiment, the storage operation interrupt module 150 comprises logic (e.g., electrical circuits, programmable logic, executable code, state machine, embedded controller) of a memory element 123 (e.g., an integrated circuit, chip, die, die plane, package) of non-volatile memory media 122, so that the storage operation interrupt module 150 may interrupt a storage operation from within the memory element 123, without receiving a suspend command from an external controller 124, 126, or the like. Integrating a storage operation interrupt module 150 on a memory element 123 itself, in certain embodiments, may allow a storage operation to be interrupted without an external controller 124, 126 tracking timing for and/or state information of the storage operation. The storage operation interrupt module 150 may allow a controller 124, 126 to define a frequency with which a storage operation is to be interrupted (e.g., a number of pulses or segments between interruptions), without an explicit suspend command. In a further embodiment, the storage operation interrupt module 150 is part of or integrated with a controller 124, 126, and may interrupt a storage operation using one or more vendor-provided suspend/resume commands (e.g., CMD FFh to suspend, CMD 27 h to resume, or the like).

The storage operation interrupt module 150, in certain embodiments, instead of executing a single, contiguous storage operation (e.g., an erase operation, a write/program operation, or the like) may be configured to interrupt, pause, suspend, breakup, and/or otherwise divide a storage operation into multiple phases or segments. As used herein, a storage operation "phase" or "segment" comprises a partial operation, one or more pulses of a storage operation, and/or another portion of a storage operation, between which another operation may be executed. The storage operation interrupt module 150 may execute one or more other storage operations (e.g., read, write/program, and/or erase storage operations) on a non-volatile memory element 123 between executing different phases or segments of an interrupted or divided storage operation.

By interrupting, pausing, suspending, breaking up, and/or dividing a storage operation into multiple phases, divisions, segments, and/or portions, the storage operation interrupt module 150, in one embodiment, may decrease a latency for other, co-pending storage operations, may reduce stress or wear on the non-volatile memory media 122 when compared to a default storage operation, or the like. In certain embodiments, the storage operation interrupt module 150 may interrupt, pause, suspend, breakup, or divide a storage operation or procedure internally, within a storage element 123, based on a parameter indicating a frequency for interrupting the storage operation, received from a controller 124, 126, from a storage client 116, or the like.

The storage operation interrupt module 150, in one embodiment, may interrupt or otherwise adjust an executing operation at a predefined periodic interval. The predefined periodic interval may be relative to an operation, counted from a beginning of the operation itself or the like. For example, the storage operation interrupt module 150 may interrupt an operation, such as an erase operation, periodically each 5 pulses, each 500 microseconds, or the like, segmenting the operation into multiple phases so that pending operations may execute between phases. The storage operation interrupt module 150, in certain embodiments, may interrupt an operation periodically regardless of any pending operations with higher execution priorities. In another embodiment, the storage operation interrupt module 150 may periodically check for pending operations with higher execution priorities, and may interrupt a storage operation in response to a pending operation with a higher execution priority (e.g., an insertable storage operation).

In one embodiment, the storage operation interrupt module 150 may comprise executable software code, such as a device driver, SML 130, or the like, stored on the computer readable storage media 114 for execution on the processor 111. In another embodiment the storage operation interrupt module 150 may comprise logic hardware of one or more non-volatile memory devices 120, such as a non-volatile memory media controller 126, a non-volatile memory controller 124, a device controller, a field-programmable gate array (FPGA) or other programmable logic, firmware for an FPGA or other programmable logic, microcode for execution on a microcontroller, an application-specific integrated circuit (ASIC), or the like. In a further embodiment, the storage operation interrupt module 150 may include a combination of both executable software code and logic hardware.

In one embodiment, the storage operation interrupt module 150 is configured to receive storage requests from the SML 130 via a bus 125 or the like. The storage operation interrupt module 150 may be further configured to transfer data to/from the SML 130 and/or storage clients 116 via the bus 125. Accordingly, the storage operation interrupt module 150, in some embodiments, may comprise and/or be in communication with one or more direct memory access (DMA) modules, remote DMA modules, bus controllers, bridges, buffers, and so on to facilitate the transfer of storage requests and associated data. In another embodiment, the storage operation interrupt module 150 may receive storage requests as an API call from a storage client 116, as an IO-CTL command, or the like. The storage operation interrupt module 150 is described in greater detail below with regard to FIGS. 3 and 4.

According to various embodiments, a non-volatile memory controller 124 comprising the storage operation interrupt module 150 may manage one or more non-volatile memory devices 120. The non-volatile memory device(s) 120 may comprise recording, memory, and/or storage devices, such as solid-state storage device(s), that are arranged and/or partitioned into a plurality of addressable media storage locations. As used herein, a media storage location refers to any physical unit of memory (e.g., any quantity of physical storage media on a non-volatile memory device 120). Memory units may include, but are not limited to: pages, memory divisions, erase blocks, sectors, blocks, collections or sets of physical storage locations (e.g., logical pages, logical erase blocks, described below), or the like.

The non-volatile memory controller 124 may comprise an SML 130, which may present a logical address space 134 to one or more storage clients 116. One example of an SML is the Virtual Storage Layer® of SanDisk Corporation of Milpitas, Calif. Alternatively, each non-volatile memory device 120 may comprise a non-volatile memory media controller 126, which may present a logical address space 134 to the storage clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

The SML 130 may maintain metadata 135, such as a forward index, to map logical addresses of the logical address space 134 to media storage locations on the non-volatile memory device(s) 120. The SML 130 may provide for arbitrary, any-to-any mappings from logical addresses to physical storage resources. As used herein, an "any-to any" mapping may map any logical address to any physical storage resource. Accordingly, there may be no pre-defined and/or pre-set mappings between logical addresses and particular, media storage locations and/or media addresses. As used herein, a media address refers to an address of a memory resource that uniquely identifies one memory resource from another to a controller that manages a plurality of memory resources. By way of example, a media address includes, but is not limited to: the address of a media storage location, a physical memory unit, a collection of physical memory units (e.g., a logical memory unit), a portion of a memory unit (e.g., a logical memory unit address and offset, range, and/or extent), or the like. Accordingly, the SML 130 may map logical addresses to physical data resources of any size and/or granularity, which may or may not correspond to the underlying data partitioning scheme of the non-volatile memory device(s) 120. For example, in some embodiments, the non-volatile memory controller 124 is configured to store data within logical memory units that are formed by logically combining a plurality of physical memory units, which may allow the non-volatile memory controller 124 to support many different virtual memory unit sizes and/or granularities.

As used herein, a logical memory element refers to a set of two or more non-volatile memory elements that are or are capable of being managed in parallel (e.g., via an I/O and/or control bus). A logical memory element may comprise a plurality of logical memory units, such as logical pages, logical memory divisions (e.g., logical erase blocks), and so on. As used herein, a logical memory unit refers to a logical construct combining two or more physical memory units, each physical memory unit on a respective non-volatile memory element in the respective logical memory element (e.g., each non-volatile memory element being accessible in parallel). As used herein, a logical memory division refers to a set of two or more physical memory divisions, each physical memory division on a respective non-volatile memory element in the respective logical memory element.

The logical address space 134 presented by the SML 130 may have a logical capacity, which may correspond to the number of available logical addresses in the logical address space 134 and the size and/or granularity of the data referenced by the logical addresses. For example, the logical capacity of a logical address space 134 comprising $2^{32}$ unique logical addresses, each referencing 2048 bytes (2 KiB) of data may be $2^{43}$ bytes. As used herein, a kibibyte (KiB) refers to 1024 bytes. In some embodiments, the logical address space 134 may be thinly provisioned. As used herein, a "thinly provisioned" logical address space 134 refers to a logical address space 134 having a logical capacity that exceeds the physical capacity of the underlying non-volatile memory device(s) 120. For example, the SML 130 may present a 64-bit logical address space 134 to the storage clients 116 (e.g., a logical address space 134 referenced by 64-bit logical addresses), which may exceed the physical capacity of the underlying non-volatile memory devices 120. The large logical address space 134 may allow storage clients 116 to allocate and/or reference contiguous ranges of logical addresses, while reducing the chance of naming conflicts. The SML 130 may leverage the any-to-any mappings between logical addresses and physical storage resources to manage the logical address space 134 independently of the underlying physical storage devices 120. For example, the SML 130 may add and/or remove physical storage resources seamlessly, as needed, and without changing the logical addresses used by the storage clients 116.

The non-volatile memory controller 124 may be configured to store data in a contextual format. As used herein, a contextual format refers to a self-describing data format in which persistent contextual metadata is stored with the data on the physical storage media 122. The persistent contextual metadata provides context for the data with which it is stored. In certain embodiments, the persistent contextual metadata uniquely identifies the data with which the persistent contextual metadata is stored. For example, the persistent contextual metadata may uniquely identify a sector or block of data owned by a storage client 116 from other sectors or blocks of data owned by the storage client 116. In a further embodiment, the persistent contextual metadata identifies an operation that is performed on the data. In a further embodiment, the persistent contextual metadata identifies a sequence of operations performed on the data. In a further embodiment, the persistent contextual metadata identifies security controls, a data type, or other attributes of the data. In a certain embodiment, the persistent contextual metadata identifies at least one of a plurality of aspects, including data type, a unique data identifier, an operation, and a sequence of operations performed on the data.

The persistent contextual metadata may include, but is not limited to: a logical address of the data, an identifier of the data (e.g., a file name, object id, label, unique identifier, or the like), reference(s) to other data (e.g., an indicator that the data is associated with other data), a relative position or offset of the data with respect to other data (e.g., file offset, etc.), data size and/or range, and the like. The contextual data format may comprise a packet format comprising a data segment and one or more headers. Alternatively, a contextual data format may associate data with context information in other ways (e.g., in a dedicated index on the non-volatile memory media 122, a memory division index, or the like).

In some embodiments, the contextual data format may allow data context to be determined and/or reconstructed based upon the contents of the non-volatile memory media 122, and independently of other metadata, such as the arbitrary, any-to-any mappings discussed above. Since the media location of data is independent of the logical address of the data, it may be inefficient or impossible to determine the context of data based solely upon the media location or media address of the data. Storing data in a contextual format on the non-volatile memory media 122 may allow data context to be determined without reference to other metadata. For example, the contextual data format may allow the metadata to be reconstructed based only upon the contents of the non-volatile memory media 122 (e.g., reconstruct the any-to-any mappings between logical addresses and media locations).

In some embodiments, the non-volatile memory controller 124 may be configured to store data on one or more asymmetric, write-once media 122, such as solid-state storage media. As used herein, a "write once" storage medium refers to a storage medium that is reinitialized (e.g., erased) each time new data is written or programmed thereon. As used herein, an "asymmetric" storage medium refers to a storage medium 122 having different latencies for different storage operations. Many types of solid-state storage media are asymmetric; for example, a read operation may be much faster than a write/program operation, and a write/program operation may be much faster than an erase operation (e.g., reading the media may be hundreds of times faster than erasing, and tens of times faster than programming the media).

The memory media 122 may be partitioned into memory divisions that can be erased as a group (e.g., erase blocks) in order to, inter alia, account for the asymmetric properties of the media 122 or the like. As such, modifying a single data segment in-place may require erasing the entire erase block comprising the data, and rewriting the modified data to the erase block, along with the original, unchanged data. This may result in inefficient "write amplification," which may excessively wear the media 122. Therefore, in some embodiments, the non-volatile memory controller 124 may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (e.g., the erasure latency is no longer part of the critical path of a write operation).

The non-volatile memory controller 124 may comprise one or more processes that operate outside of the regular path for servicing of storage operations (e.g., the "path" for performing a storage operation and/or servicing a storage request.) As used herein, the "path for servicing a storage request" or "path for servicing a storage operation" (also referred to as the "critical path") refers to a series of processing operations needed to service the storage operation or request, such as a read, write, modify, or the like. The path for servicing a storage request may comprise receiving the request from a storage client 116, identifying the logical addresses of the request, performing one or more storage operations on non-volatile memory media 122, and returning a result, such as acknowledgement or data. Processes that occur outside of the path for servicing storage requests may include, but are not limited to: a groomer, de-duplication, and so on. These processes may be implemented autonomously and in the background, so that they do not interfere with or impact the performance of other storage operations and/or requests. Accordingly, these processes may operate independent of servicing storage requests.

In certain embodiments, as the non-volatile memory media controller 124 causes the non-volatile memory media 122 to be programmed and erased by applying various program and erase voltages to floating gates of the storage cells, electron charges may become trapped in a tunnel oxide layer of the storage cells, and may build up over time. Depending on a configuration of the program and/or erase procedures used, the amount of trapped electrons may vary.

As used herein, a storage operation (e.g., an erase procedure, a program/write procedure, a read procedure), may comprise one or more phases, segments, steps, pulses, and/or other portions which together satisfy a predetermined goal and/or result (e.g., erasing data from storage cells, programming data to storage cells, reading data from storage cells, or the like). By default, in certain embodiments, a storage operation may be completed by executing phases, segments, steps, pulses, and/or other portions of the storage operation consecutively (e.g., without interruption). From the perspective of the computing device 110, a storage client 116, the SML 130, the non-volatile memory media controller 126, and/or the non-volatile memory controller 124, a storage operation may be implemented or completed in response to a single command or request, even if the storage operation uses a plurality of separate, independent phases, segments, steps, pulses, or other portions from the perspective of the non-volatile memory media 122 or from a non-volatile memory element 123.

For example, a storage client 116 may send a write request to store data in the non-volatile memory device 120 or a trim request to erase data from the non-volatile memory device 120, the non-volatile memory controller 124 may select one or more erase blocks of the non-volatile memory media 122 to erase for garbage collection as part of a storage capacity recovery operation, or the like. A program procedure for the non-volatile memory media 122 may include a single program operation executed using a single program command (e.g., including address information, data of the write request, or the like) for a respective memory element 123 (and/or for several memory elements 123 in an array) associated with the request, which may cause the non-volatile memory element(s) 123 to perform a program operation comprising a plurality of electrical pulses of varying voltage levels until the single program operation either succeeds or fails.

Similarly, an erase procedure for an erase block of the non-volatile memory media 122 may include a single erase operation executed using a single erase command (e.g., including an address of an erase block or the like) for a respective memory element 123 to be erased (and/or for several memory elements 123 in an array), which may cause the non-volatile memory element(s) 123 to perform an erase operation comprising a plurality of electrical pulses of varying voltage levels until the single erase operation either succeeds or fails.

An erase and/or program operation may include N number of pulses (e.g., a maximum loop count of 16 or the like). A loop count N for the non-volatile memory media 122, in certain embodiments, may be set high enough to ensure that an operation successfully completes, and the storage operation interrupt module 150 may periodically interrupt, pause, and/or suspend the operation to provide a consistent latency for other operations. Each iteration of applying an increased voltage to erase or program cells may be referred to as a loop (e.g., an erase loop, a program loop, or the like). On each iteration, the erase block, page, or other set of storage cells receives an electric pulse with a predefined voltage. For an erase operation, each pulse may be configured to push electrons out of the floating gate while a pulse of a program operation may push electrons into the floating gate, or the like. Each iteration or pulse may be applied for a fixed time period or predetermined duration (e.g., 600-700 microseconds or the like). The voltage applied during an operation may be configured to gradually increase (e.g., ramp up) during the first pulse of an operation. A ramp up voltage may be performed to mitigate the damage on oxide by slowly applying the higher voltages to the cells, or the like. High voltages may cause damage to the oxide layers that separate the floating gate from the other layers.

In some embodiments, the non-volatile memory controller 124 comprises a groomer, which is configured to reclaim memory divisions (e.g., logical or physical erase blocks) for reuse, using a garbage collection or other storage capacity recovery process. The write out-of-place paradigm implemented by the non-volatile memory controller 124 may result in obsolete or invalid data remaining on the non-volatile memory media 122. For example, overwriting data X with data Y may result in storing Y on a new memory division (e.g., rather than overwriting X in place), and updating the any-to-any mappings of the metadata to identify Y as the valid, up-to-date version of the data. The obsolete version of the data X may be marked as invalid, but may not be immediately removed (e.g., erased), since, as discussed above, erasing X may involve erasing an entire memory division, which is a time-consuming operation and may result in write amplification. Similarly, data that is no longer is use (e.g., deleted or trimmed data) may not be immediately removed. The non-volatile memory media 122 may accumulate a significant amount of invalid data.

A groomer process may operate outside of the critical path for servicing storage operations. The groomer process may reclaim memory divisions so that they can be reused for other storage operations. As used herein, reclaiming a memory division refers to erasing the memory division so that new data may be stored/programmed thereon. Reclaiming a memory division may comprise relocating valid data on the memory division to a new location. The groomer may identify memory divisions for reclamation based upon one or more factors, which may include, but are not limited to: the amount of invalid data in the memory division, the amount of valid data in the memory division, wear on the memory division (e.g., number of erase cycles), time since the memory division was programmed or refreshed, and so on.

The non-volatile memory controller 124 may be further configured to store data in a log format. As described above, a log format refers to a data format that defines an ordered sequence of storage operations performed on a non-volatile memory media 122. In some embodiments, the log format comprises storing data in a predetermined sequence of media addresses of the non-volatile memory media 122 (e.g., within sequential pages and/or erase blocks of the media 122). The log format may further comprise associating data (e.g., each packet or data segment) with respective sequence indicators. The sequence indicators may be applied to data individually (e.g., applied to each data packet) and/or to data groupings (e.g., packets stored sequentially on a memory division, such as an erase block). In some embodiments, sequence indicators may be applied to memory divisions when the memory divisions are reclaimed (e.g., erased), as described above, and/or when the memory divisions are first used to store data.

In some embodiments the log format may comprise storing data in an "append only" paradigm. The non-volatile memory controller 124, using the log storage module 137 described below or the like, may maintain a current append point at a media address of the non-volatile memory device 120. The append point may be a current memory division and/or offset within a memory division. Data may then be sequentially appended from the append point. The sequential ordering of the data, therefore, may be determined based upon the sequence indicator of the memory division of the data in combination with the sequence of the data within the memory division. Upon reaching the end of a memory division, the non-volatile memory controller 124 may identify the "next" available memory division (e.g., the next memory division that is initialized and ready to store data). The groomer may reclaim memory divisions comprising invalid, stale, and/or deleted data, to ensure that data may continue to be appended to the media log.

The log format described herein may allow valid data to be distinguished from invalid data based upon the contents of the non-volatile memory media 122, and independently of other metadata. As discussed above, invalid data may not be removed from the non-volatile memory media 122 until the memory division comprising the data is reclaimed. Therefore, multiple "versions" of data having the same context may exist on the non-volatile memory media 122 (e.g., multiple versions of data having the same logical addresses). The sequence indicators associated with the data may be used to distinguish invalid versions of data from the current, up-to-date version of the data; the data that is the most recent in the log is the current version, and previous versions may be identified as invalid.

The storage management layer (SML) 130 may be configured to provide storage services to one or more storage clients 116. The storage clients 116 may include local storage clients 116 operating on the computing device 110 and/or remote, storage clients 116 accessible via the network 115 and/or network interface 113. The storage clients 116 may include, but are not limited to: operating systems, file systems, database applications, server applications, kernel-level processes, user-level processes, applications, and the like.

The storage management layer (SML) 130 comprises and/or is communicatively coupled to one or more non-volatile memory devices 120. The one or more non-volatile memory devices 120 may include different types of non-volatile memory devices including, but not limited to: solid-state storage devices, hard drives, SAN storage resources, or the like. The one or more non-volatile memory devices 120 may comprise one or more respective non-volatile memory media controllers 126 and non-volatile memory media 122. As illustrated in FIG. 1, The SML 130 may provide access to the one or more non-volatile memory devices 120 via a traditional block I/O interface 131. Additionally, the SML 130 may provide access to enhanced functionality (e.g., a large, virtual address space 134) through the SML interface 132. The metadata 135 may be used to manage and/or track storage operations performed through any of the Block I/O interface 131, SML interface 132, cache interface 133, or other, related interfaces.

The cache interface 133 may expose cache-specific features accessible via the SML 130. Also, in some embodiments, the SML interface 132 presented to the storage clients 116 provides access to data transformations implemented by the one or more non-volatile memory devices 120 and/or the one or more non-volatile memory media controllers 126.

The SML 130 may provide storage services through one or more interfaces, which may include, but are not limited to: a block I/O interface, an extended storage management layer interface, a cache interface, and the like. The SML 130 may present a logical address space 134 to the storage clients 116 through one or more interfaces. As discussed above, the logical address space 134 may comprise a plurality of logical addresses, each corresponding to respective media locations the on one or more non-volatile memory devices 120. The SML 130 may maintain metadata 135 comprising any-to-any mappings between logical addresses and media locations, as described above.

The SML 130 may further comprise a log storage module 137 that is configured to store data in a contextual, log format. The contextual, log data format may comprise associating data with persistent contextual metadata, such as the logical address of the data, or the like. The contextual, log format may further comprise associating data with respective sequence identifiers on the non-volatile memory media 122, which define an ordered sequence of storage operations performed on the one or more non-volatile memory devices 120, as described above.

The SML 130 may further comprise a non-volatile memory device interface 139 configured to transfer data, commands, and/or queries to the one or more non-volatile memory devices 120 over a bus 125, which may include, but is not limited to: a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The non-volatile memory device interface 139 may communicate with the one or more non-volatile memory devices 120 using input-output control (IO-CTL) command(s), IO-CTL command extension(s), remote direct memory access, or the like.

The communication interface 113 may comprise one or more network interfaces configured to communicatively couple the computing device 110 and/or the non-volatile memory controller 124 to a network 115 and/or to one or more remote, network-accessible storage clients 116. The storage clients 116 may include local storage clients 116 operating on the computing device 110 and/or remote, storage clients 116 accessible via the network 115 and/or the network interface 113. The non-volatile memory controller 124 comprises one or more non-volatile memory devices 120. Although FIG. 1 depicts a single non-volatile memory device 120, the disclosure is not limited in this regard and could be adapted to incorporate any number of non-volatile memory devices 120.

The non-volatile memory device 120 may comprise non-volatile memory media 122, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like. While the non-volatile memory media 122 is referred to herein as "memory media," in various embodiments, the non-volatile memory media 122 may more generally comprise a non-volatile recording media capable of recording data, which may be referred to as a non-volatile memory media, a non-volatile storage media, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, and the like. A non-volatile memory media controller 126 may be configured to manage storage operations on the non-volatile memory media 122, and may comprise one or more processors, programmable processors (e.g., field-programmable gate arrays), or the like. In some embodiments, the non-volatile memory media controller 126 is configured to store data on and/or read data from the non-volatile memory media 122 in the contextual, log format described above, and to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. As discussed above, the logical memory element may be partitioned into respective logical memory units (e.g., logical pages) and/or logical memory divisions (e.g., logical erase blocks). The logical memory units may be formed by logically combining physical memory units of each of the non-volatile memory elements. For example, if the non-volatile memory media 122 comprises twenty-five (25) non-volatile memory elements, each logical memory unit may comprise twenty-five (25) pages (e.g., a page of each element of non-volatile memory media 122).

The non-volatile memory controller 124 may comprise an SML 130 and the non-volatile memory media controller 126. The SML 130 may provide storage services to the storage clients 116 via one or more interfaces 131, 132, and/or 133. In some embodiments, the SML 130 provides a block-device I/O interface 131 through which storage clients 116 perform block-level I/O operations. Alternatively, or in addition, the SML 130 may provide a storage management layer (SML) interface 132, which may provide other storage services to the storage clients 116. In some embodiments, the SML interface 132 may comprise extensions to the block device interface 131 (e.g., storage clients 116 may access the SML interface 132 through extensions to the block device interface 131). Alternatively, or in addition, the SML interface 132 may be provided as a separate API, service, and/or library. The SML 130 may be further configured to provide a cache interface 133 for caching data using the non-volatile memory system 102.

As described above, the SML 130 may present a logical address space 134 to the storage clients 116 (e.g., through the interfaces 131, 132, and/or 133). The SML 130 may maintain metadata 135 comprising any-to-any mappings between logical addresses in the logical address space 134 and media locations on the non-volatile memory device 120. The metadata 135 may comprise a logical-to-physical mapping structure with entries that map logical addresses in the logical address space 134 and media locations on the non-volatile memory device 120. The logical-to-physical mapping structure of the metadata 135, in one embodiment, is sparsely populated, with entries for logical addresses for which the non-volatile memory device 120 stores data and with no entries for logical addresses for which the non-volatile memory device 120 does not currently store data. The metadata 135, in certain embodiments, tracks data at a block level, with the SML 130 managing data as blocks.

The non-volatile memory system 102 may further comprise a log storage module 137, which, as described above, may be configured to store data on the non-volatile memory device 120 in a contextual, log format. The contextual, log data format may comprise associating data with a logical address on the non-volatile memory media 122. The contextual, log format may further comprise associating data with respective sequence identifiers on the non-volatile memory media 122, which define an ordered sequence of storage operations performed on the non-volatile memory media 122, as described above. The non-volatile memory controller 124 may further comprise a non-volatile memory device interface 139 that is configured to transfer data, commands, and/or queries to the non-volatile memory media controller 126 over a bus 125, as described above.

Figure 2:
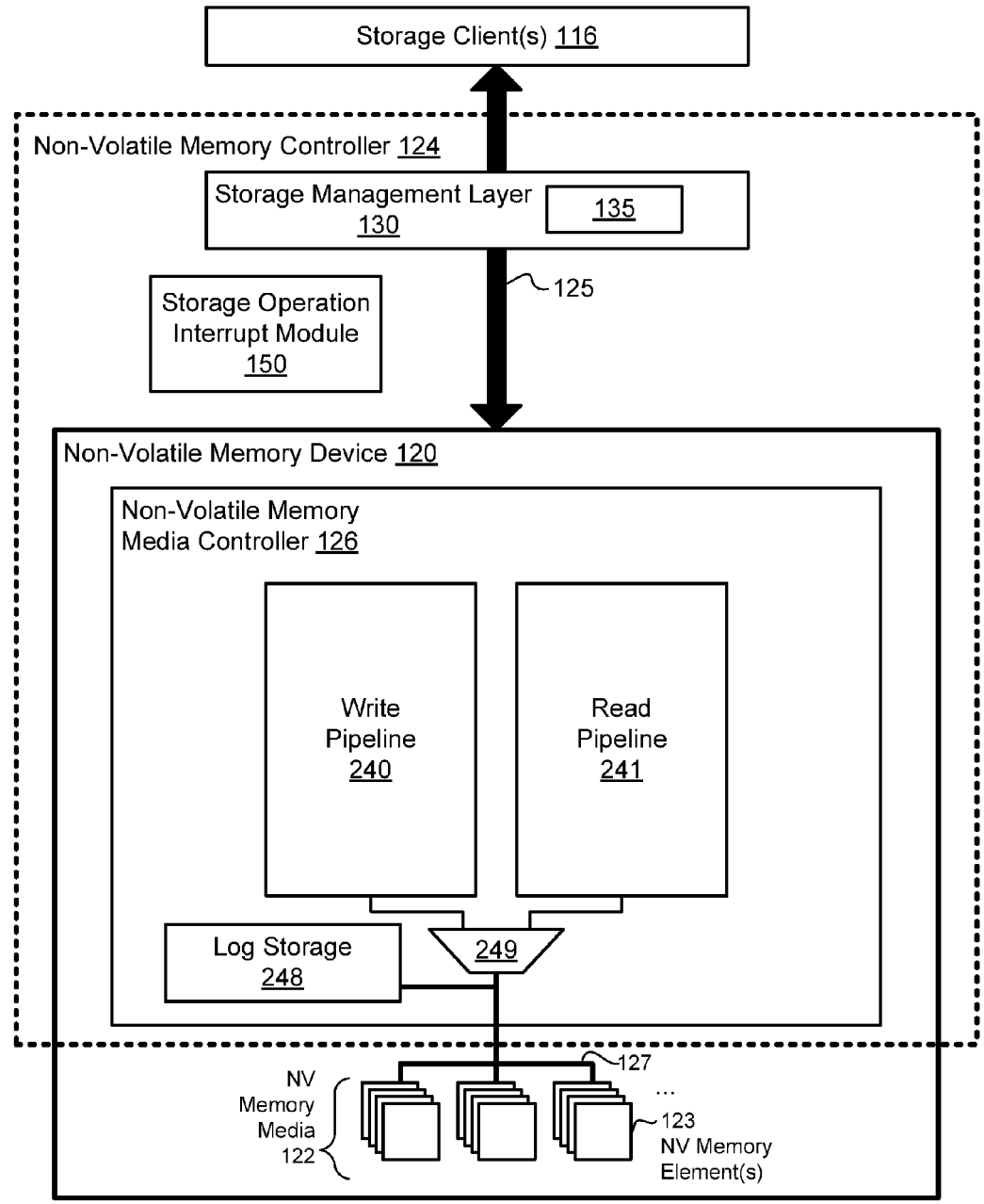
FIG. 2 is a schematic block diagram illustrating one embodiment of a non-volatile memory controller for interrupting storage operations.

FIG. 2 depicts another embodiment of a non-volatile memory controller 124 configured to service storage requests. The non-volatile memory device 120 may comprise a non-volatile memory media controller 126 and non-volatile memory media 122. The non-volatile memory media 122 may comprise a plurality of non-volatile memory elements 123, which may be communicatively coupled to the non-volatile memory media controller 126 via a bus 127, as described above.

The non-volatile memory media controller 126 may comprise a write pipeline 240 that is configured to store data on the non-volatile memory media 122 in a contextual format in response to requests received via the storage operation interrupt module 150. The requests may include and/or reference data to be stored on the non-volatile memory media 122, may include logical address(es) of the data, and so on. As described above, the contextual format may comprise storing a logical address of the data in association with the data on the non-volatile memory media 122. For example, the write pipeline 240 may be configured to format data into packets, and may include the logical address of the data in a packet header or other packet field. The write pipeline 240 may be configured to buffer data for storage on the non-volatile memory media 122. In some embodiments, the write pipeline 240 may comprise one or more synchronization buffers to synchronize a clock domain of the non-volatile memory media controller 126 with a clock domain of the non-volatile memory media 122 and/or bus 127.

The log storage module 248 may be configured to select media location(s) for the data and may provide addressing and/or control information to the non-volatile memory elements 123 via the bus 127. In some embodiments, the log storage module 248 is configured to store data sequentially in a log format within the non-volatile memory media. The log storage module 248 may be further configured to groom the non-volatile memory media, as described above. In certain embodiments the log storage module 248 is substantially similar to the log storage module 137 as described above. The log storage module 248 may be executed by the SML 130 and/or by the non-volatile memory media controller 126.

Upon writing data to the non-volatile memory media, the non-volatile memory media controller 126 may be configured to update metadata 135 (e.g., a forward index) to associate the logical address(es) of the data with the media address(es) of the data on the non-volatile memory media 122. In some embodiments, the metadata 135 may be maintained on the non-volatile memory media controller 126; for example, the metadata 135 may be stored on the non-volatile memory media 122, on a volatile memory (not shown), or the like. Alternatively, or in addition, the metadata 135 may be maintained within the SML 130 (e.g., on a volatile memory 112 of the computing device 110 of FIG. 1). In some embodiments, the metadata 135 may be maintained in a volatile memory by the SML 130, and may be periodically stored on the non-volatile memory media 122.

The non-volatile memory media controller 126 may further comprise a read pipeline 241 that is configured to read contextual data from the non-volatile memory media 122 in response to requests received via the storage operation interrupt module 150. The requests may comprise a logical address of the requested data, a media address of the requested data, and so on. The read pipeline 241 may be configured to read data stored in a contextual format from the non-volatile memory media 122 and to provide the data to the SML 130 and/or a storage client 116. The read pipeline 241 may be configured to determine the media address of the data using a logical address of the data and the metadata 135. Alternatively, or in addition, the SML 130 may determine the media address of the data and may include the media address in the request. The log storage module 248 may provide the media address to the non-volatile memory elements 123, and the data may stream into the read pipeline 241 via a buffer. The read pipeline 241 may comprise one or more read synchronization buffers for clock domain synchronization, as described above.

The non-volatile memory media controller 126 may further comprise a multiplexer 249 that is configured to selectively route data and/or commands to/from the write pipeline 240 and the read pipeline 241. In some embodiments, non-volatile memory media controller 126 may be configured to read data while filling a buffer of the write pipeline 240 and/or may interleave one or more storage operations on one or more banks of non-volatile memory elements 123 (not shown).

Figure 3:
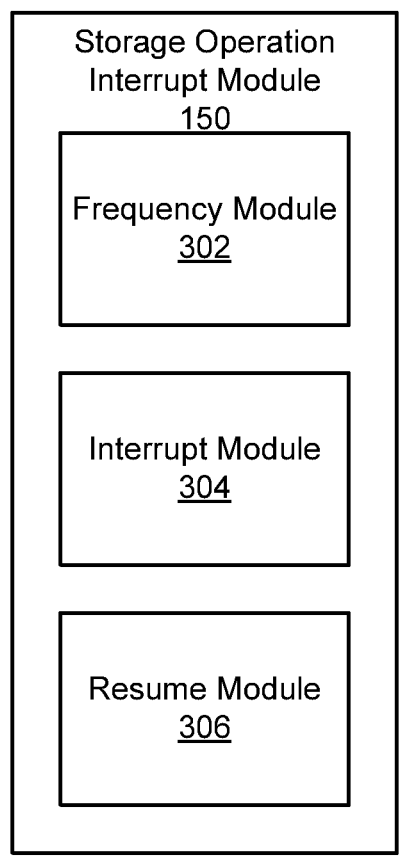
FIG. 3 is a schematic block diagram of one embodiment of a storage operation interrupt module.

FIG. 3 depicts one embodiment of a storage operation interrupt module 150. The storage operation interrupt module 150 may be substantially similar to the storage operation interrupt module 150 described above with regard to FIG. 1. In general, as described above, the storage operation interrupt module 150 receiving, at a storage element, an indicator of how often a storage operation is to be interrupted, interrupting execution of the storage operation on the storage element one or more times based on the indicator, and executing one or more other storage operations on the storage element while the storage operation is interrupted. In the depicted embodiment, the storage operation interrupt module 150 includes a frequency module 302, and interrupt module 304, and a resume module 306. The modules 302-306, in one embodiment, are communicatively coupled to one another, for example, via a data communication bus.

The frequency module 302, in one embodiment, is configured to determine a frequency for pausing a storage operation. As used herein, a "frequency for pausing a storage operation" refers to an indicator of how often a storage operation is to be or may be interrupted, paused, divided, suspended, or the like. In certain embodiments, a frequency for pausing a storage operation may be a mandatory frequency or interval at which a storage operation is interrupted regardless of other pending operations or other factors. In other embodiments, a frequency for pausing a storage operation may be an optional frequency, a maximum frequency, or the like, permitting or allowing interruption of a storage operation up to the identified frequency or at the identified interval but not requiring it. For example, a frequency for pausing a storage operation may identify an interval or frequency at which the interrupt module 304, described below, may check for a pending storage operation and selectively interrupt an executing storage operation if a pending storage operation is identified, but the interrupt module 304 may otherwise allow the executing storage operation to continue, uninterrupted.

In one embodiment, a frequency for pausing a storage operation may be measured or indicated by a number of storage operation steps, cycles, and/or pulses. In another embodiment, a frequency for pausing a storage operation may be measured in interruptions per second, or fraction thereof, such as milliseconds (ms), microseconds, nanoseconds, or the like. In certain embodiments, an interrupt indicator may be expressed as a period between successive interruptions. Thus, a frequency for pausing or interrupting a storage operation may refer to a number of interruptions per unit of time, a number of interruptions per operation, a number of pulses or other steps of an operation between interruptions, and/or an amount of time between interruptions (e.g., in nanoseconds, microseconds, milliseconds, or the like).

Further, a frequency for pausing or interrupting a storage operation may be relative to a fixed period of time and/or to a variable timeframe. For example, in certain embodiments, a frequency refers to a count over a fixed period of time. In other embodiments, a frequency refers to a number of disruptions over an open ended duration (e.g., per storage operation). For example, a program operation may have an average execution time that changes over the life of the element. In addition, an erase operation may also have an average execution time that varies over the life of the non-volatile memory device 120.

As the device ages, the average execution time of a program operation may decrease while an average execution time of an erase operation may increase. Program and erase storage operations execute for up to a maximum number of iterations until they either succeed (meet a verify voltage level) or fail. The number of iterations needed for a storage operation to succeed typically changes as the device ages. In other words, the duration of the storage operation is variable and the time needed for a storage operation to succeed changes as the device ages. Due to the varying average execution time, the frequency module 302, in one embodiment, may be configured to determine an interrupt frequency (e.g., the frequency for pausing the storage operation) on a per operation basis, that is, to determine a fixed number of interruptions over the open ended duration of the storage operation.

In certain embodiments, the non-volatile memory system 102 may provide one or more multi-phase commands. As used herein, a "multi-phase" command is a command that performs a sequence of phases or steps in order to accomplish an end result of the command. Program and erase commands are examples of multi-phase commands. In one embodiment, the frequency module 302 may organize phases of a multi-phase command based on the frequency for pausing a storage operation such that phases have a length corresponding to the frequency for pausing a storage operation.

On flash media, a program operation is a multi-phase operation in which the storage elements automatically perform each of the phases before reporting that the operation is completed. Specifically, the storage element applies successively increasing amounts of voltage to storage cells to cause the stored charge in the cell to increase. Then, the storage element reads the value of the cell to determine if the voltage for the cell is within a certain range indicative of having programmed the cell. If so, the storage element stops the programming operation, and returns to a ready state in which a new operation can be performed. If not, the storage element applies another amount of voltage and re-reads the cell to determine if the voltage for the cell is within a certain range indicative of having programmed the cell. This process repeats until a cell of a storage element is programmed. Similarly, an iterative set of multiple phases is performed by the storage elements to erase cells in an erase block of a storage element. The phases may vary depending on how the non-volatile storage device 120 manufacturers have designed their devices.

In some embodiments, the frequency module 302 sets an interrupt frequency parameter defining the frequency for pausing a storage operation (e.g., an indicator of how often the storage operation is to be interrupted). In one embodiment, the frequency module 302 sets a 2-bit interrupt frequency parameter (e.g., having values of "0," "1," "2," and "3") that indicates the number of storage operation loops (or phases) before suspending the storage operation. For instance, a "0" value may be used to select a mode where the storage operation is not suspended, a "1" value may be used to select a mode where the storage operation is suspended after two operation loops, a "2" value may be used to select a mode where the storage operation is suspended after four operation loops, and a "3" value may be used to select mode where the storage operation is suspended after eight operation groups. In other instances, the values of the interrupt frequency parameter may indicate other numbers of storage operation loops (or phases) before suspending the storage operation.

In some embodiments, the frequency module 302 sends an interrupt frequency or interrupt indicator to the interrupt module 304, and the interrupt module 304 suspends or pauses execution of a storage operation based on the interrupt frequency or interrupt indicator. In one embodiment, an interrupt indicator requires the interrupt module 304 to pause or suspend a storage operation after an amount of time or after a number of operation steps specified by the interrupt indicator. For example, an interrupt indicator may cause the interrupt module 304 to interrupt a storage operation every 500 ms or after every two program or erase pulses.

In another embodiment, an interrupt indicator may specify a permissible or maximum number of interruptions the interrupt module 304 is permitted to make within a given timeframe or per storage operation. Accordingly, the frequency module 302 may determine a maximum frequency for pausing a storage operation and the interrupt module 304 may interrupt the storage operation a number of time up to the maximum frequency, may check for insertable or interleavable storage operations (e.g., read operations) at the maximum frequency, or the like. For example, the frequency module 302 may indicate, via an interrupt indicator, an interrupt frequency, or the like, that the interrupt module 304 may interrupt a storage operation as often as once every 500 ms, and the interrupt module 304 may interrupt the storage operation less frequently if conditions merit (e.g., according to workload, quality of service requirements, priority of queued storage operations, or the like). In another example, an interrupt indicator may indicate that the interrupt module 304 is to interrupt a storage operation at least once every 500 ms, and the interrupt module 304 may interrupt the storage operation more frequently than 500 ms if conditions merit, as described below.

In some embodiments, the frequency module 302 determines the frequency for pausing a storage operation based on the workload of the non-volatile memory device 120. As used herein, the workload of the non-volatile memory device 120 refers to a number, ratio, and/or percentage of different types of storage operations performed on the non-volatile memory device 120 (e.g., read operations, write/program operations, and/or erase operations). For example, the workload of the non-volatile memory device 120 may be a ratio of read storage operations to erase storage operations, of read storage operations to program storage operations, or read storage operations to non-read storage operations. Thus, the frequency module 302 may calculate a frequency indicator based on the particular mix of read storage operations and non-read storage operations the non-volatile memory device 120 is experiencing. Further, frequency module 302 may dynamically adjust the frequency indicator as the workload of the non-volatile memory device 120 changes.

In some embodiments, the frequency module adjusts the frequency for interrupting the storage operation as workload ratio of non-read storage operations increases. In certain embodiments, the frequency module 302 receives information regarding the workload ratio from another module such as the workload module 402. The workload ratio information, in one embodiment, describes an amount, or percentage, of read storage operations to non-read storage operations (e.g. program storage operations and/or erase storage operations) and indicates to the frequency module 302 whether the interruption frequency should increase or decrease based on the amount of read storage operations performed by the non-volatile memory device 120.

For example, as the amount of read storage operations performed by the non-volatile memory device 120 increases, the frequency module 302 increases the frequency at which program storage operations and/or erase storage operations are interrupted, thereby increasing the rate at which read storage operations are interleaved with segments (e.g., phases) of the non-read storage operations and improving read storage operation performance in the non-volatile memory device 120. Conversely, as the amount of read storage operations performed by the non-volatile memory device 120 decreases, the frequency module 302 decreases the frequency at which program storage operations and/or erase storage operations are interrupted, thereby improving non-read storage operation performance in the non-volatile memory device 120. For example, if the amount of read storage operations drops below a certain level, the frequency module 302 may indicate an interruption frequency of zero (e.g. indicating that an executing storage operation does not need to be interrupted). By dynamically splitting program and/or erase operations into phases based on the user workload, performance of the nonvolatile memory device 120 is optimized.

In some embodiments, the frequency module 302 determines the frequency for interrupting the storage operation based on a quality of service metric associated with the non-volatile memory device 120. In one embodiment, the non-volatile memory device 120 may be associated with a particular quality of service (QoS) requirement for read storage operations, for program storage operations, for erase storage operations, and/or for other storage operations. Accordingly, the frequency module 302 may determine the need to interrupt a storage operation with a longer duration, for example an erase operation, in order to meet the quality of service requirement for storage operation with a shorter duration. The frequency module 302, may determine the interruption frequency for longer storage operations so as to provide interruptions often enough to meet quality of service requirements for shorter storage operations.

In one embodiment, the frequency module 302 expresses the frequency of interrupting a storage operation as a number of storage operation cycles, loops, and/or steps between successive interruptions of the storage operation. In another embodiment, the frequency module 302 expresses the frequency of interrupting a storage operation as an amount of time between successive interruptions, for example as a number of milliseconds between interruptions.

In certain embodiments, frequency module 302 determines the interruption frequency based on an average operation time (e.g., duration) for the storage operation. For storage operations having an average operation time less than an operation time threshold, the frequency module 302 may determine that the storage operation is not to be interrupted. For example, if a particular storage operation has an average duration of 0.9 ms and if the threshold is 1.0 ms, then the frequency module 302 may determine not to interrupt the particular storage operation even if it would otherwise interrupt a storage operation every 0.5 ms. In some embodiments, the operation time threshold may be based on a quality of service parameter for the non-volatile memory device 120. In further embodiments, the operation time threshold may be adjusted as the workload of the non-volatile memory device 120 changes, as a quality of service parameter for the non-volatile memory device 120 changes, or as the non-volatile memory device 120 ages.

In certain embodiments, the frequency module 302 determines the interruption frequency based on the type of the storage operation. In one embodiment, storage operations of a particular type may be uninterruptible. For example, a read operation may be considered uninterruptible due to the extremely low duration of the read operation. As another example, where the non-volatile memory device 120 workload indicates that program storage operations are predominant on the non-volatile memory device 120, the program storage operations may be considered uninterruptible while the workload predominantly favors program storage operations. Thus, the frequency module 302 may identify the type of the storage operation determine the interruption frequency based on whether storage operation type is an interruptible operation type.

In certain embodiments, the frequency module 302 may determine the interruption frequency based on an application type of an application using the non-volatile memory device 120. In certain embodiments, the frequency module 302 may determine the interruption frequency based on a storage client 116 associated with the non-volatile memory device 120. In some embodiments, the frequency module 302 may receive an interrupt indicator from a controller or from a storage client 116, and the frequency module 302 may determine the frequency for interrupting a storage operation based on the received indicator.

The interrupt module 304, in one embodiment, is configured to pause execution of the storage operation according to the determined frequency. As used herein, "pausing" execution of a storage operation means to pause, interrupt, suspend, or otherwise disrupt the execution of the storage operation. The interrupt module 304 pauses the execution of the storage operation in such a way as to allow later resumption of the storage operation. References herein to "pausing" are inclusive of other equivalent or similar terms, including, but not limited to, suspending, interrupting, queuing, and delaying.

In certain embodiments, the interrupt module 304 references an interrupt frequency parameter that defines how often a storage operation is to be interrupted. In other embodiments, the interrupt module 304 receives an indication of a number of portions or segments into which the storage operation is to be divided. The interrupt module 304 may then determine the amount of time (e.g., a number of operation loops, cycles, segments, phases, or the like) between subsequent interruptions of the storage operation based on the referenced interrupt frequency parameter and/or the indicated number of sub-operations.

In one embodiment, the interrupt module 304 is embedded in a storage element 123 of the data storage medium 122 and directly interrupts or pauses the execution of the storage operation. In another embodiment, the interrupt module 304 is part of and/or integrated with an external controller 124, 126 and sends one or more storage operation commands to the data storage medium 122 (e.g., to one or more storage elements 123) and the storage operation commands may be configured to interrupt or pause the execution of the storage operation (e.g., a FFh suspend command or the like).

In some embodiments, the interrupt module 304 monitors progress of the storage operation. For example, the interrupt module 304 may count a number of completed segments (e.g., erase cycles) completed within an erase storage operation. In response to the storage operation progress matching the frequency for pausing a storage operation, the interrupt module 304 may then pause or interrupt the storage operation. In one embodiment, the interrupt module 304 may calculate a period of time indicated by the frequency for pausing a storage operation. In another embodiment, the interrupt module 304 may calculate a number of cycles, loops, steps, and/or segments equal to a period of time indicated by the frequency for pausing a storage operation.

In one embodiment, the interrupt module 304 determines a number of phases for the storage operation based on the determined frequency. For example, the interrupt module 304 may split storage operation to two or more phases, each phase having a maximum length being based on the determined frequency. In another embodiment, the interrupt module may determine a period of time equal to the determined interruption frequency and segment the storage operation into phases with length no greater than the determined period of time. In a further embodiment, the interrupt module 304 may calculate a number of cycles equal to the determined interruption frequency. The interrupt module 304 a further segment storage operation at every calculated number cycles.

As used herein, "segmenting" the storage operation refers to determining points within the storage operation where the storage operation is to be interrupted, paused, suspended, or otherwise disrupted. Thus, a storage operation may be logically segmented into a plurality of segments or phases, each having a length based on the determined interruption frequency. In some embodiments, each segment of a storage operation has the same length. In another embodiment, a storage operation may be segmented into one or more whole segments and a remainder segment, the one or more whole segments having a length corresponding to the interrupt frequency and the remainder segment having a length less than the whole segments.

In some embodiments, the interrupt module 304 includes a plurality of suspend timers and a plurality of suspend trackers, each suspended timer and each suspended tracker associated with a group of memory cells. The suspend timers, in one embodiment, track the amount of execution time of a currently executing storage operation. In some embodiments, the amount of execution time is represented by seconds, milliseconds, or microseconds. In other embodiments, the amount of execution time is represented by loops, cycles, steps, or other portions of the storage operation. When the tracked amount of execution time reaches an amount corresponding to the interrupt frequency, the interrupt module 304 suspends or pauses the executing storage operation and the suspend tracker records the status of executing storage operation. In one embodiment, the status of the executing storage operation include state information for the executing storage operation an indication of whether the executing storage operation is in an incomplete state.

The interrupt module 304, in certain embodiments, may interrupt a single operation multiple times. The interrupt module 304 may determine whether or not to interrupt or otherwise adjust an executing operation to ensure that the executing operation completes and is not starved. In one embodiment, once the resume module 306 resumes an interrupted operation, the interrupt module 304 does not re-interrupt or re-adjust the executing operation so that the executing operation completes execution within a predetermined time period, even if one or more subsequent operations are received with higher execution priorities than the executing operation.

In another embodiment, the interrupt module 304 is configured to track a number of times the storage operation has been interrupted. For example, the interrupt module 304 increments an interrupt counter upon interrupting the storage operation. The interrupt counter indicates a number of times the storage operation has been interrupted. The interrupt counter may be used to prevent additional interruptions of the storage operation once an interrupt count threshold is been reached.

Accordingly, the interrupt module 304 may compare the tracked number of interruptions to an interrupt count threshold, the interrupt count threshold defining a maximum number of interruptions for a storage operation. In response to the number of interruptions of the storage operation meeting the interrupt count threshold, the interrupt module 304 may prohibit further interruptions of the storage operation. This prevents the interrupted storage operation from being perpetually interrupted (e.g., starved). In one embodiment, the interrupt count threshold is based on one or more of a storage operation type of the interrupted storage operation, a quality of service requirement associated with the non-volatile memory device 120, an application requesting storage operations on the non-volatile memory device 120, and a workload of the non-volatile memory device 120.

In some embodiments, the interrupt module 304 is configured to prevent interruption of an interleaved storage operation, the interleaved storage operation being executed while another storage operation is interrupted. As used herein, an "interleaved" storage operation is a subsequent storage operation executing while a first storage operation is paused or interrupted. The interrupt module 304 prevents interruption of interleaved storage operation so as to not overwrite state information of the paused storage operation and to reduce overall memory requirements for pausing the storage operations. For example, an erase storage operation may be interrupted according to the frequency indicator and a program storage operation may be executed while the erase storage operation is interrupted. The interrupt module 304 prevents the program storage operation (e.g. the interleaved storage operation) from being interrupted as the erase storage operation is already interrupted.

For example, the interrupt module 304 may be configured to interrupt an erase storage operation to six times. Further the frequency indicator may indicate that a storage operation is to be interrupted every 1.5 ms while an erase storage operation may typically take 15 ms to complete. Thus, the interrupt module 304 may interrupt the erase storage operation every 1.5 ms for six interruptions after which the interrupt module 304 no longer interrupts the erase storage operation.

In some embodiments, the interrupt module 304 may be configured to interrupt only certain types of storage operations. Examples of data storage device management operations that may be interruptible include a program operation, an erase operation, a refresh operation, a grooming or data moving/relocating operation, and the like. In one embodiment, the types of storage operations that are interruptible are based on quality of service requirements, current workload of the non-volatile memory device 120, or the like. As a further example, the interrupt module 304 may be configured to interrupt only storage operations with an average operation time exceeding an operation time threshold. In certain embodiments, the interrupt module 304 is configured to retrieve a quality of service parameter associated with the media device, and the interrupt module 304 may prevent interruption of the storage operation based on the quality of service parameter.

In one embodiment, the interrupt module 304 may be configured to initiate an interrupt timer upon interrupting the storage operation. The interrupt timer may be used to identify when the interrupted storage operation should resume. For example, the resume module 306 may await, as a triggering event, the expiration of the interrupt timer before resuming the interrupted storage operation.

In some embodiments, the interrupt module 304 identifies whether the storage operation is complete when it interrupts the storage operation. For example, the interrupt module 304 initiate a verify step at the time indicated by the interruption frequency. If the verify step indicates that the storage operation is complete, then interrupt module 304 ceases to interrupt the storage operation and instead provides an indication that the storage operation was successful. Otherwise, if the verify step indicates that the storage operation is incomplete, the interrupt module 304 proceeds to pause or interrupt the storage operation and provides a status indicator (e.g., a 1-bit value) indicating that the interrupted operation is incomplete. The status indicator may later be examined by the resume module 306 when resuming the storage operation. In some embodiments, the non-volatile memory controller 124, storage operation interrupt module 150, interrupt module 304, and/or resume module 306 may reset a status indicator bit when the interrupted storage operation finishes successfully. In further embodiments, the status indicator bit may be reset in response to a suspend command (e.g., a CMD FFh) received from the nonvolatile memory controller 124 or other interrupt which is not done based on the interruption frequency.

In certain embodiments, the interrupt module 304 checks for insertable storage operations prior to interrupting the storage operation. As used herein, an "insertable" or "interleavable" storage operation is another storage operation capable of being inserted, or interleaved, into an execution order such that the insertable storage operation is executed during interruption of another storage operation. A pending storage operation in an operation queue may qualify as an insertable storage operation based on its priority, operation time, quality of service requirement, an effect on one or more storage cells and/or storage elements 123, or other characteristic. For example, the interrupt module 304 may examine an operation queue for storage operations having a higher priority, shorter operation time, and/or a stricter quality of service requirement.

If the interrupt module 304 determines that one or more qualifying storage operations are pending and operation queue, then the interrupt module 304 interrupts the storage operation in favor of the one or more qualifying storage operations. For example, the interrupt module 304 may interrupt an executing storage operation and the intervening operation module 404 may execute one or more intervening (insertable) storage operations while the first storage operation is interrupted.

Otherwise, if the interrupt module 304 determines that no qualifying storage operations are pending in the operation queue, then the interrupt module 304 may refrain from interrupting the storage operation. In one embodiment, the interrupt module 304 may check for an indicator of a pending storage operation in the operation queue. The interrupt module 304 may then refrain from interrupting the storage operation in response to the indicator indicating that there are no pending storage operations.

In another embodiment, the interrupt module 304 may always interrupt a currently executing storage operation based on interruption frequency determined by the frequency module 302, and the resume module 306 and/or the intervening operation module 404 may check for insertable storage operations within the operation queue. If there are no insertable storage operations within the operation queue (e.g., there are no pending storage operations with higher priority, shorter operation time, and/or stricter quality of service requirement), then the resume module 306 and/or the intervening operation module 404 may immediately and automatically resume the interrupted storage operation.

In some embodiments, the interrupt module 304 may store state information relating to the state of the storage operation when the operation is paused, interrupted, or suspended. In other embodiments, the interrupt module 304 may signal the operation state module 410 to store state information relating to the interrupted storage operation. The state information, in one embodiment, may include a location within the storage operation at the point the storage operation is interrupted. For example, the state information may identify a programming step or an erase step within the storage operation. As another example, the state information may identify a loop count and/or voltage of the storage operation.

In another embodiment, the state information may include information relating to one or more pages (either logical pages or physical pages) where the storage operation was operating, for example an identifier of a page (e.g., an upper page or lower page) being programmed by the storage operation when the storage operation is interrupted. In further embodiments, the interrupt module 304 may store information relating to the data being written for a program storage operation, so as to more quickly resume storage operation at a later point.

The resume module 306, in one embodiment, is configured to continue the paused storage operation in response to a trigger. In some embodiments, the trigger comprises one or more of: receiving a resume request, satisfying an interrupt time threshold since pausing execution the storage operation, and executing a threshold number of other operations (e.g., an intervening operation threshold) while the storage operation is paused. In further embodiments, the trigger may be received from the counter module 408 and/or from the threshold module 412. The resume module 306, in one embodiment, may continue the paused storage operation by issuing the resume command (e.g., a 27h command).

In some embodiments, the resume module 306 examines a storage operation queue in response to the interrupt module 304 interrupting storage operation. If the resume module 306 does not identify an insertable storage operation, then the resume module 306 may immediately resume the interrupted storage operation. Otherwise, if the resume module 306 identifies an insertable storage operation, then the resume module 306 allows the insertable storage operation to execute, after which the resume module 306 may resume the interrupted storage operation. The insertable storage operation, in one embodiment, includes any storage operation having one or more of a higher priority, a lower operation time, and a higher quality of service requirement. For example, if a program storage operation is interrupted and a read storage operation is in the storage operation queue, the resume module 306 may wait for the read operation to complete, after which the resume module 306 may resume the interrupted program storage operation.

In some embodiments, the resume module 306 automatically resumes the storage operation. Accordingly, the trigger for resuming the interrupt storage operation may be an automatically generated trigger, such as one generated by expiration of an interrupt timer or by an intervening operation counter reaching an intervening operation threshold. In other embodiments, the resume module 306 may await a resume command (e.g., resume request) before resuming the storage operation. Thus, the trigger for resuming the interrupted storage operation may be a resume command received from a controller in one embodiment. In yet another embodiment, the resume module 306 may send a resume command in response to the automatically generated trigger. For example, the resume module 306 may generate a 27h resume command in response to the automatically generated trigger (e.g., expiration of the interrupt timer or the reaching the intervening operation threshold).

In certain embodiments, the resume module 306 may receive the trigger while an intervening storage operation is executing. In one embodiment, the resume module 306 may wait for the intervening storage operation to complete before resuming the interrupted storage operation. In another embodiment, the resume module 306 may abort the intervening storage operation in response to receiving the trigger and immediately resume the interrupted storage operation.

In some embodiments, the resume module 306, in resuming the storage operation, may restart the storage operation the beginning. In other embodiments, the resume module 306 resumes the storage operation at the point of interruption. In further embodiments, the resume module 306 retrieve state information regarding the interrupted storage operation in order to resume the storage operation. The state information may relate to the state of the storage operation when the operation is paused, interrupted, or suspended. In one embodiment, state information indicates the point at which an interrupted command or operation is to be resumed to complete the interrupted command or operation.

The resume module 306, using the state information, may resume an interrupted storage operation at the same phase, point, or stage at which the command was interrupted, may perform the previously executed stages in an expedited manner, or the like, so that resuming an interrupted storage operation is more efficient than restarting the interrupted storage operation. The state information may comprise a number of steps, phases, stages, or pulses of an operation completed before interruption, a step or stage at which an operation is to resume, or the like. For example, state information for an erase operation may include a pulse duration, a pulse strength, a ratchet parameter, an error toleration, or the like that the resume module 306 may use to resume an interrupted erase operation. In embodiments where such state information is not available, previously executed steps or stages may re-execute in an expedited or accelerated manner, as the steps or stages have already been executed. The state information, in one embodiment, may comprise a current state of one or more storage cells at the time of the interruption.

In some embodiments, resume module 306 may adjust one or more parameters the interrupted storage operation upon resuming said storage operation. In one embodiment, the resume module 306 may extend the length of the interrupted storage operation beyond the length of an uninterrupted storage operation upon resuming the interrupted storage operation. For example, the resume module 306 may cause a storage operation voltage, a voltage step size, a number of steps in operation be adjusted so as to extend the interrupted storage operation. Beneficially, the resume module 306 may extend interrupted storage operation condition storage media of the non-volatile memory device 120. In another embodiment, the resume module 306 may just parameters of the interrupted storage operation based on quality of service requirements the non-volatile memory device 120.

In one embodiment, the resume module 306 increments an interrupt counter upon resuming the interrupted storage operation. The interrupt counter indicates a number of times the storage operation has been interrupted. The interrupt counter may be used to prevent additional interruptions of the storage operation once an interrupt count threshold is been reached. For example, the interrupt module 304 may refrain from interrupting the storage operation in response to the interrupt counter exceeding the interrupt count threshold.

In one embodiment, the resume module 306 resumes the interrupted storage operation by initially performing a verify step. If the verify step indicates that the storage operation has successfully completed, then the resume module 306 may terminate the storage operation. Otherwise, if the verify step indicates that the storage operation is incomplete, then the resume module 306 may continue the storage operation and/or restart the storage operation. In certain embodiments, the resume module 306 may examine a status indicator that indicates whether the interrupted storage operation is an incomplete state. If the status indicator indicates an incomplete storage operation, the resume module 306 may continue storage operation and/or restart the storage operation. Otherwise, if the status indicator indicates the completed storage operation, then the resume module 306 may terminate the storage operation.

Figure 4:
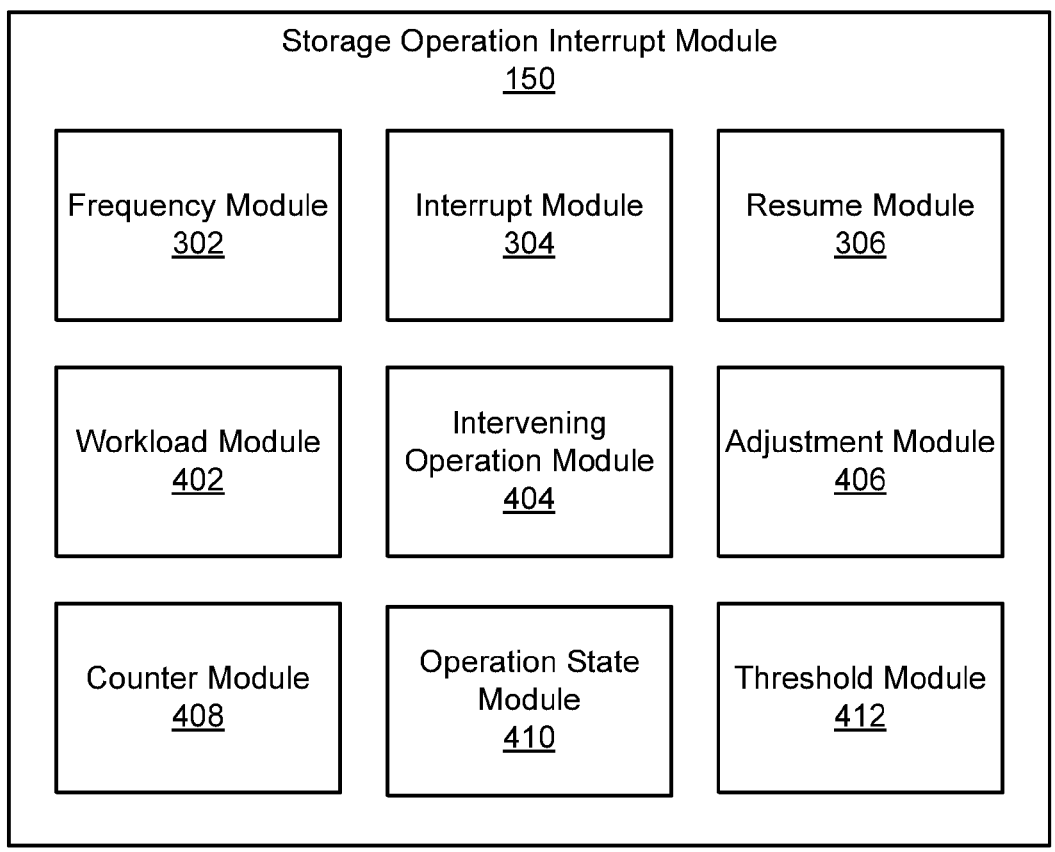
FIG. 4 is a schematic block diagram of another embodiment of a storage operation interrupt module.

FIG. 4 depicts another embodiment of a storage operation interrupt module 150. The storage operation interrupt module 150 may be substantially similar to the storage operation interrupt module 150 described above with regards to FIGS. 1-3. In general, as described above, the storage operation interrupt module 150 determines a frequency for pausing a storage operation, pauses execution of the storage operation according to determined frequency, and continues the pause to storage operation in response to a trigger. In the depicted embodiment, the storage operation interrupt module includes a frequency module 302, an interrupt module 304, and a resume module 306. The storage operation interrupt module further includes a workload module 402, an adjustment module 406, a counter module 408, an operation state module 410, a counter module 408, and a threshold module 412. The modules 302-306 and 402-412, in one embodiment, may be communicatively coupled to one another, for example, via a data communication bus.

The workload module 402, in one embodiment, is configured to identify a workload associated with the non-volatile memory device 120. As described above, the "workload" associated with a non-volatile memory device 120 refers to the number, ratio, and/or percentage of different types of storage operations performed on the non-volatile memory device 120. In one embodiment, the workload of the non-volatile memory device 120 be characterized by a predominant type of storage operation. For instance, in a read intensive workload, the amount of read storage operations performed by the non-volatile memory device 120 is greater than the amount of non-read storage operations performed by the non-volatile memory device 120. As another example, in a program intensive workload, the amount of program storage operations performed by the non-volatile memory device 120 is greater than the amount of non-program storage operations performed by the non-volatile memory device 120.

In one embodiment, the workload module 402 is located within the non-volatile memory controller 124 and since workload information to the frequency module 302. The frequency module 302 may determine whether a program and/or erase operation needs to be split into multiple phases to improve read performance and/or a number of phases the program and/or erase operation needs to be split into based on the workload information. In another embodiment, the workload module 402 is located on the nonvolatile memory device 120 (e.g., on the memory die) for which an associated workload is identified. In a further embodiment, the workload module 402 may be a submodule of the frequency module 302.

In some embodiments, the workload associated with the non-volatile memory device 120 is expressed as a ratio, for example, the ratio of read storage operations to non-read storage operations. The workload ratio information, in one embodiment, describes an amount, or percentage, of read storage operations to non-read storage operations (e.g., program storage operations and/or erase storage operations). In another embodiment, the workload ratio may describe an amount, or percentage, of program operations to non-program operations executed on the non-volatile memory device 120.

In some embodiments, the workload module 402 determines the workload associated with the non-volatile memory device 120 using a plurality of counters, each counter tracking a number of executed storage operations of a particular type. In one embodiment, the workload is determined using a weighted average and/or a moving average where more recent values are given greater weight than less recent values. The workload may be periodically updated. In further embodiments, the workload module may determine the current workload ratio and/or percentage using one or more calculators associated with the plurality of counters.

Beneficially, the workload is used to optimize performance of the non-volatile memory device 120 based on current usage (e.g., workload) of the non-volatile memory device 120. Accordingly, the workload module 402 identifies the workload associated with the non-volatile memory device 120 and provides a workload indicator to other modules of the storage operation interrupt module 150, the workload indicating the current usage of the non-volatile memory device 120.

In some embodiments, the workload module 402 indicates the current workload of the non-volatile memory device 120 to one or more of the frequency module 302, and the frequency module 302 adjusts the frequency at which storage operations are interrupted based on the workload. In one embodiment, the frequency module 302 determines the interruption frequency based on the average operation time and the workload ratio. In a further embodiment, the frequency module 302 may indicate a phase length (e.g., a length, in seconds or in cycles, of the phase between subsequent interruptions based on the interruption frequency) and/or a number of phases and which the storage operation should be split based on the workload ratio.

For example, if a workload ratio comprises a percentage of time spent on program storage operations, and the workload module 402 indicates the workload ratio to the frequency module 302, which may adjust an interrupt frequency for a storage operation based on the workload ratio and on the average operation time. In one instance, the program percentage may be 10% and the average program storage operation time may be 1500 µs, and the frequency module 302 may indicate that a program operation (or other non-read storage operation) should be suspended at an interval equal to the program percentage (e.g., 0.10) multiplied by the average program storage operation time (e.g., 1500 µs), thus at an interval equal to 150 µs. In another instance, the program percentage may be 50% and the frequency module 302 may indicate a lower frequency for pausing a storage operation, for example the program operation should be suspended at an interval equal to the program percentage (e.g., 0.50) multiplied by the average program storage operation time (e.g., 1500 µs), thus at interval equal to 750 µs.

In certain embodiments, the frequency module 302 may determine that no interruptions are to be made to a storage operation if the workload ratio satisfies a threshold (e.g., the workload ratio is above a workload threshold amount, below a workload threshold amount, within a predefined range, or the like). For instance, in the above example, if the program percentage is 90%, the frequency module 302 may determine not to suspend a program storage operation, as the current workload of the non-volatile memory device 120 is highly write intensive (e.g., the workload ratio satisfies a workload threshold of 0.75, or the like). Accordingly, by tuning the frequency for pausing a storage operation according to the current workload profile, the storage operation interrupt module 150 may customize and/or optimize performance the non-volatile memory device 120 based on the workload profile.

Further, by tuning the frequency for pausing the storage operation to the workload profile, the overall input/output per second (IOPS) performance, in certain embodiments, may be the same regardless of the number of phases, segments, and/or portions into which the storage operation is split. Additionally, the average read latency may decrease as longer storage operations (e.g., program/erase storage operations) are broken into phases, in one embodiment. This may be accomplished, in certain embodiments, by reducing the perceived storage operation time of the longer storage operations (e.g., program/erase storage operations) when the longer storage operations are broken into phases. As each phase has a shorter length than the overall storage operation, a read storage operation, in certain embodiments, is not blocked for to the entire execution of the longer storage operation. Moreover, as the workload becomes more read intensive, the phase length may decrease thereby reducing the waiting time for read operations. A drawback may be an increase in overall time of the non-read operations, however, this may be manageable as the increase in operation time may be a small percentage of the uninterrupted operation time, or the like.

The intervening operation module 404, in one embodiment, is configured to execute one or more intervening storage operations while the initial storage operation is interrupted (e.g., paused). In some embodiments, the intervening operation module 404 selects the one or more intervening storage operations from an operation queue that contains a one or more pending storage operations. In certain embodiments, the intervening operation module 404 may select the one or more intervening storage operations based on average operation time for a type of storage operation to which a pending storage operation blocks, a priority of a pending storage operation, and/or a quality of service requirement of a pending storage operation.

In some embodiments, the intervening operation module 404 executes up to a threshold number of intervening storage operations while the initial storage operation is paused. In one embodiment, the intervening operation module 404 monitors an amount of intervening storage operations executed on the non-volatile memory device 120 and compares the executed amount to an intervening operations threshold. When the intervening operations threshold is met, the intervening operation module 404 may then cease to execute additional intervening storage operations.

In certain embodiments, the intervening operation module 404 executes intervening storage operations from the operation queue until an interrupt timer expires, the interrupt timer initiated in response to the interrupt module 304 interrupting the storage operation. In on embodiment, the intervening operation module 404 may allow an executing intervening storage operation to complete and then ceases to execute additional intervening storage operations, in response to expiration of the interrupt timer. In a further embodiment, the intervening operation module 404 may signal the resume module 306 to resume the interrupted storage operation responsive to expiration of the interrupt timer and completion of the executing intervening storage operation. In some embodiments, the intervening operation module 404 prevents interruption of the one or more intervening storage operations. For example, the intervening storage operation module 404 may provide an indicator bit signaling that the executing storage operation is an intervening storage operation and should not be interrupted.

The adjustment module 406, in one embodiment, is configured to modify, adjust, and/or set an operation parameter (e.g., an erase parameter, a program parameter, or the like) for the resumed storage operation, changing the operation parameter from a default value or the like. An operation parameter may comprise a parameter for a storage operation for a set of storage cells that is modifiable by way of an interface. Operation parameters may relate to writing to or programming storage cells, reading from storage cells, erasing storage cells, managing storage cells, and/or to another operation or procedure for storage cells. The adjustment module 406 may determine an operation parameter as an absolute data value, as an offset or adjustment to a data value, or as another parameter with which the adjustment module 406 may configure a storage operation or procedure for a set of storage cells.

As described above, embodiments of an operation parameter for erasing storage cells (e.g., an erase parameter) may include a voltage level step size or magnitude for an incremental step pulse erase operation, a maximum number of iterations or pulses for an incremental step pulse erase operation (e.g., a loop count), an erase verify threshold voltage level for an erase operation, an initial bias or start erase voltage level for an incremental step pulse erase operation, a erase pulse duration for an incremental step pulse erase operation, a maximum erase voltage, or the like.

An operation parameter for writing/programming storage cells (e.g., a program parameter), in certain embodiments, may include a voltage level step size or magnitude for an incremental step pulse programming operation, a maximum number of iterations or pulses for an incremental step pulse programming operation (e.g., a loop count), a program verify threshold voltage level for a program operation, an initial bias or start program voltage level for an incremental step pulse programming operation, a program pulse duration for an incremental step pulse programming operation, a maximum program voltage or the like.

In one embodiment, the adjustment module 406 may adjust an initial voltage used when resuming the storage operation. For example, the adjustment module 406 may lower an initial program/erase voltage for the first program/erase loop of a program/erase operation from a value recorded in state information for the program/erase storage operation when resuming the program/erase storage operation. As another example, the adjustment module 406 may raise an initial program/erase voltage for the first program/erase loop of a program/erase operation from a default initial program/erase voltage when resuming the program/erase storage operation.

In some embodiments, the adjustment module 406 extends the interrupted storage operation upon resumption of the interrupted storage operation. For example, the adjustment module 406 may extend an interrupted storage operation by adjusting an initial and/or and voltage for the operation, adjusting a voltage step size for the storage operation, adjusting a number of steps for the storage operation, adjusting a verify voltage for the storage operation, and/or adjusting a step duration for the storage operation. The extended storage operation may then have an operation time duration that exceeds a default storage operation of the same type (e.g., where the parameters the storage operations are not adjusted).

In certain embodiments, the adjustment module 406 may be configured to determine and/or monitor a use threshold, or the like for storage cells of the non-volatile memory device 120 and to apply an extended erase operation to an erase block or other group of storage cells to recondition the storage cells in response satisfying the use threshold, and may otherwise apply a default erase operation. An extended erase operation may operate using a lower verify voltage, a lower initial voltage, a smaller differential voltage between steps of the erase operation, longer pulse durations of the erase operation, or the like than a default erase operation, and may therefore have a longer duration than a default erase operation. An extended erase operation may be gentler, deeper, and/or slower than a default erase operation, and may release, free, or purge trapped electrons so as to recondition the storage cells.

In some embodiments, the adjustment module 406 adjust one or more parameters of the resumed storage operation so as to comply with a quality of service requirement relating to the resumed storage operation. For example, if the quality of service requirement for the program operation indicates that the overall operation time (including delays due to interruption) must be within a certain timeframe and/or amount of time, the adjustment module 406 may adjust parameters of the storage operation so as to complete the storage operation within the certain timeframe and/or amount of time. In certain embodiments, the adjustment module 406 may just parameters of the resumed storage operation so as to reduce the time in which the resumed portion of the storage operation is completed. For example, the adjustment module 406 may increase the voltage step size for the resumed storage operation, decreasing number of steps of the resumed storage operation, increase/decrease a verify voltage of the resumed storage operation, increase an initial voltage of the resumed storage operation, and/or decrease a step duration for the resumed storage operation.

The counter module 408, in one embodiment, is configured to track a number of intervening other storage operations executed while the storage operation is interrupted. For example, the counter module 408 may increment a counter each time an intervening storage operation is executed and/or completed. In certain embodiments, the counter module 408 may compare the number of intervening storage operations executed during the interruption of the storage operation to an intervening operation threshold (e.g., a threshold number of allowable intervening storage operations). In further embodiments, the counter module 408 may indicate to the resume module 306 when the intervening operation threshold is met, and the resume module 306 may automatically resume the interrupt storage operation.

In some embodiments, the counter module 408, is further configured to track a number of loops, steps, or cycles completed within a storage operation. In further embodiments, the counter module 408 may identify an amount of segments, loops, steps, or cycles equal to a phase length of the storage operation, and the storage operation is divided into a plurality of phases based on the interruption frequency. The counter module 408 may compare the current number of completed segments, loops, steps, or cycles to the identified amount of segments, loops, steps, or cycles equal to the phase length and indicate when the identified amount of segments, loops, steps, or cycles is met (thus, when execution of the storage operation has reached the end of the phase).

In some embodiments, the counter module 408 is also configured to track a number of times a given storage operation has been interrupted. For example, the counter module 408 increment each time a storage operation is interrupted. In certain embodiments, the counter module 408 may compare the number of times the storage operation has been interrupted to an interrupt count threshold. In response to the interrupt count threshold being met, the counter module 408 may signal to the interrupt module 304 to prevent further interruptions of the storage operation.

The counter module 408, in one embodiment, is configured to initiate an interrupt timer in response to interrupting execution of the storage operation. In certain embodiments, the counter module 408 may count down from a predetermined time value or may count up to a predetermined interrupt time threshold, the interrupt time threshold specifying a maximum amount of time from pausing (interrupting) execution of the storage operation. In some embodiments, the counter module 408 tracks time in terms of seconds, milliseconds, and/or microseconds. For example, the counter module 408 may be communicatively we coupled to a clock frequency used by the memory die. In other embodiments, the counter module 408 tracks time in terms of storage operation cycles (such as program/erase loops or steps).

In one embodiment, the counter module 408 automatically initiates the interrupt timer upon detecting that the storage operation has been interrupted. In another embodiment, the counter module 408 initiates the timer in response to a signal from the interrupt module 304. Upon expiration of the interrupt timer (e.g., counting down to zero or counting up to the interrupt time threshold) the counter module 408 may trigger the resume module 306, and the resume module 306 automatically resumes the interrupted storage operation in response to the trigger. In certain embodiments, interrupt timer may expire while an intervening storage operation is executing on the non-volatile memory device 120. Accordingly, the counter module 408 may wait for the intervening storage operation to complete before signaling the resume module two resume the interrupted storage operation.

The operation state module 410, in one embodiment, configured to store state information relating to an interrupted storage operation. State information relating to the storage operation may be tracked while the storage operation is running, for example at the non-volatile memory controller 124 or at a component on the non-volatile memory device 120, so that when the storage operation is suspended, the state information may be retained for resuming the storage operation. The state information may be stored in a non-volatile storage so that the information is retained in the event of a power loss.

In one embodiment, the state information includes location information, such as a location within the storage operation at the point the storage operation is interrupted. For example, the state information may identify a programming step or an erase step within the storage operation. Such information may also include, but is not limited to, step count, pulse duration, pulse magnitude, and step magnitude.

In another embodiment, the state information may include information relating to one or more pages (either logical pages or physical pages) where the storage operation was operating. For example, the operation state module 410 may store the addresses corresponding to the non-volatile memory media 122 being erased and/or an identifier of a page (e.g., an upper page or lower page) being programmed by the storage operation when the storage operation is interrupted. In further embodiments, the operation state module 410 may store information relating to the data being written for a program storage operation, so that the resume module 306 may more quickly resume the storage operation at a later point.

In some embodiments, the operation state module 410 is configured to store state information for a program/erase storage operation in response to the interrupt module 304 interrupting said program/erase storage operation. In certain embodiments, the operation state module 410 saves the state information to a cache or register located on the same die as the memory chip. In some embodiments, the operation state module 410 provides state information to the resume module 306 for resuming the interrupted storage operation.

The threshold module 412, in one embodiment, is configured to store one or more thresholds relating to interrupting a storage operation. For example, the threshold module 412 may store an operation time threshold, an interrupt count threshold, an interrupt time threshold, an intervening operation threshold, and/or a workflow threshold, as described above with reference to FIGS. 3 and 4. In one embodiment, the threshold module 412 stores the one or more thresholds in one or more registers of the non-volatile memory device 120. In some embodiments, threshold module 412 is further configured to compare a value in a counter to a threshold and to indicate whether the value exceeds the threshold. For example, the threshold module 412 may compare counters maintained by the counter module 408 to one or more thresholds stored by the threshold module 412.

Figure 5:
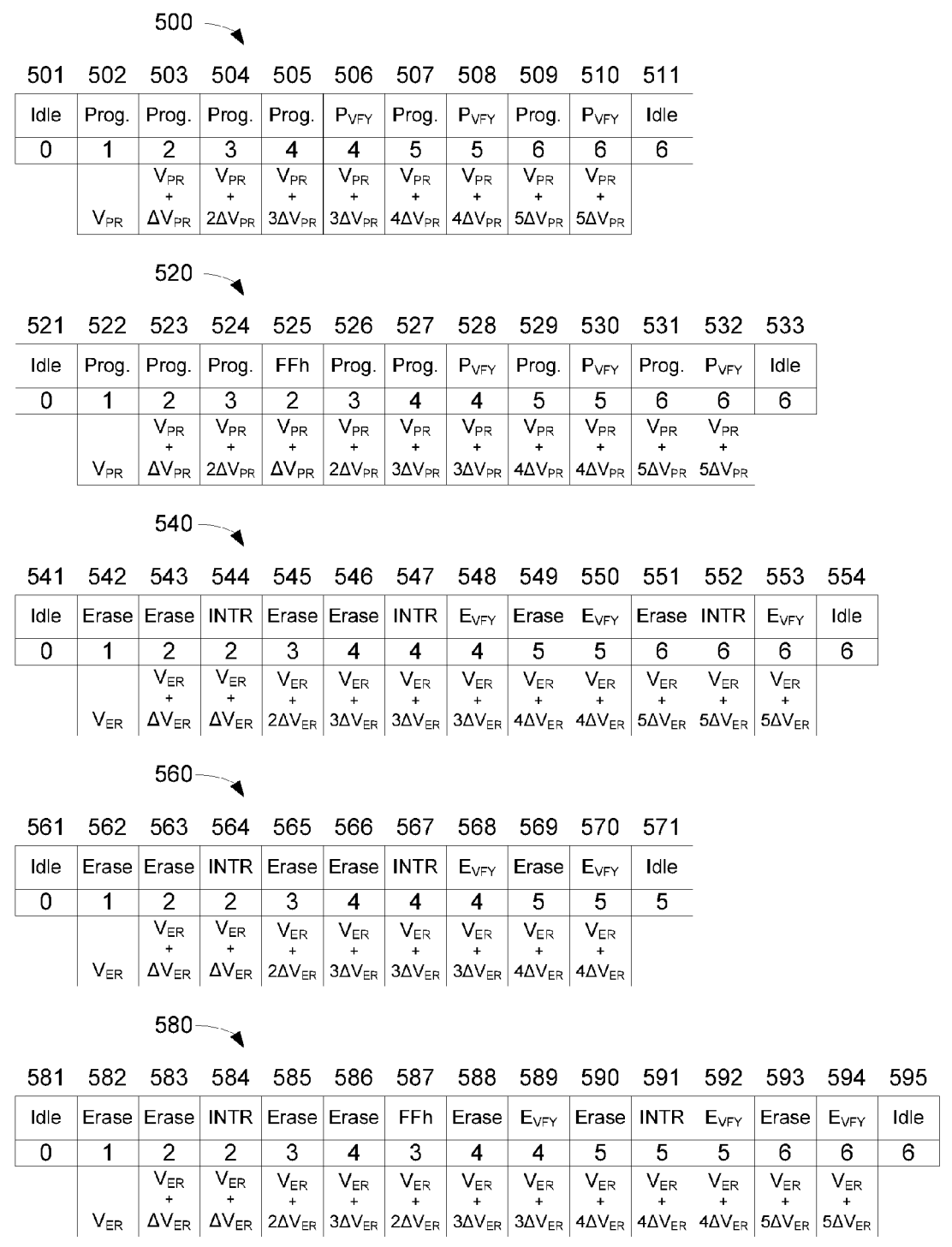

FIG. 5 depicts a plurality of storage operation block diagrams 500, 520, 540, 560, and 580, according to embodiments of the disclosure. The storage operation block diagram 500 illustrates the progress of a first program storage operation as a plurality of operation steps 501-511. As depicted, the program storage operation includes a verify step after each program loop beginning with the fourth program loop, the program storage operation successfully completing (e.g., passing the verify step) after the sixth program loop. Operation step 501 represents an idle step, where no data is being programmed to the non-volatile storage media 122. Operation steps 502-505, 507, and 509 are program steps, each program operation step being associated with a loop count (e.g., 1-6), and a program voltage. At program operation step 502, the loop count is equal to "1" and the program voltage is equal to an initial voltage "$V_{PR}$." The program operation step 503, the loop count is incremented and the program voltage is increased to a value of "$V_{PR}+\Delta V_{PR}$."

Subsequent program operation steps 504 and 505 similarly increment the loop count and the program voltage. Operation step 506 is a verify step, where the value of the programmed memory cells is read and compared to the desired value. As depicted, the read value is not equal to the desired value and so the program storage operation continues with the program operation step 507, where the loop count and a program voltage are incremented, as compared to program step 505. Again, the written value is verified at verify operation step 508, however as depicted the program storage operation is not yet successful. Accordingly, the program storage operation continues with the program operation step 509, where the loop count and the program voltage or both incremented, as compared to the program step 507. Once more, the written value is verified at verify operation step 510. This time, as depicted, the read value equals the desired value and the program operation has successfully completed. The program storage operation ends with an idle step 511.

The storage operation block diagram 520 illustrates the progress of a second program storage operation as a plurality of operation steps 521-533. As depicted, the program storage operation includes a verify step after each program loop beginning with the fourth program loop (e.g., verify steps 528, 530, and 532), the program storage operation successfully completing (e.g., passing the verify step) after the sixth program loop. Here, however, the program storage operation is interrupted by the interrupt module 304 using a controller-level command (e.g., an FFh command) according to the interruption frequency. The FFh command occurs before the ongoing erase pulse is finished (e.g., the third erase pulse) and so the loop count doesn't get incremented and the erase voltage is stored without a "$\Delta V_{PR}$" for the current loop, as depicted.

Operation step 521 represents an idle step, where no data is being programmed to the non-volatile storage media 122. Operation steps 522-524, 526-527, 529, and 531 are program steps, each program operation step being associated with a loop count (e.g., 1-6), and a program voltage. At program operation step 522, the loop count is equal to "1" and the program voltage is equal to an initial voltage "$V_{PR}$." The program operation step 523, the loop count is incremented and the program voltage is increased to a value of "$V_{PR}+\Delta V_{PR}$."

At operation step 524, a program operation step, the loop count is incremented and the program voltage is increased to a value of "$V_{PR}+2\Delta V_{PR}$." However, as depicted the suspend command "FFh" (operation step 525) is received prior to completion of the program operation step 524. Accordingly, the state of the program storage operation is stored with the loop count equal to "2" and a program voltage of "$V_{PR}+\Delta V_{PR}$."

The program storage operation resumes at operation step 526 using the state information previously stored (e.g., a loop count equal to "2" and a program voltage of "$V_{PR}+\Delta V_{PR}$"). Subsequent program operation step 527, 529, and 531 increment the loop count and the program voltage, with verify steps 528, 530, and 532 after each respective program step. As depicted, after program step 531, the programmed value is successfully verified (e.g., via verify step 532) and the program operation has successfully completed. The program storage operation ends with an idle step 533.

The storage operation block diagram 540 illustrates the progress of a first erase storage operation as a plurality of operation steps 541-554. As depicted, the erase storage operation includes a verify step after each erase loop beginning with the fourth erase loop (e.g., verify steps 548, 550, and 553), the erase storage operation successfully completing (e.g., passing the verify step) after the sixth erase loop. Here, however, the erase storage operation is directly interrupted by the interrupt module 304 at the chip level (e.g., without a FFh command) at intervals based on the interruption frequency, for example based on an interruption parameter set to "2" indicating the operation is to be suspended every two loops. Unlike the earlier program storage operation, the interrupt module 304 interrupts the erase operation after the ongoing erase pulse is finished, as depicted.

Operation step 541 represents an idle step, where no data is being erased from the non-volatile storage media 122. Operation steps 542-543, 545-546, 549, and 551 are erase steps, each erase operation step being associated with a loop count (e.g., 1-6) and an erase voltage. At erase operation step 542, the loop count is equal to "1" and the erase voltage is equal to an initial voltage "$V_{ER}$." At the erase operation step 543, the loop count is incremented and the erase voltage is increased to a value of "$V_{ER}+\Delta V_{ER}$."

At operation step 544, an interrupt step, the erase operation is paused and state of the erase storage operation is stored with the loop count equal to "2" and an erase voltage of "$V_{PR}+\Delta V_{PR}$." The erase storage operation resumes at operation step 545 incrementing the loop count and erase voltage from the state information previously stored (e.g., step 545 has a loop count equal to "3" and a erase voltage of "$V_{PR}+2\Delta V_{PR}$"). Subsequent erase operation step 546, 549, and 551 increment the loop count and the erase voltage. Verify steps 548, 550, and 553 compare a read value to an expected value to determine whether the erase operation has successfully completed. As depicted, after erase steps 546 and 551, the erase operation is again interrupted (operation steps 547 and 552) by the interrupt module 304. Note that once the erase operation begins to verify the erased value, the erase operation resumes with a verify step (operation steps 548 and 553). After the sixth erase step (operation step 551) the erase operation is successfully verified (e.g., via verify step 553). The erase storage operation ends with an idle step 554.

The storage operation block diagram 560 illustrates the progress of a second erase storage operation as a plurality of operation steps 561-571. As depicted, the erase storage operation includes a verify step after each erase loop beginning with the fourth erase loop (e.g., verify steps 568 and 570), the erase storage operation successfully completing (e.g., passing the verify step) after the fifth erase loop. Again, the erase storage operation is directly interrupted by the interrupt module 304 at the chip level (e.g., without a FFh command) at intervals based on the interruption frequency, for example based on an interruption parameter indicating the operation is to be suspended every two loops. Unlike the earlier program storage operation, the interrupt module 304 interrupts the erase operation after the ongoing erase pulse is finished, as depicted.

Operation step 561 represents an idle step, where no data is being erased from the non-volatile storage media 122. Operation steps 562-563, 565-566, and 569 are erase steps, each erase operation step being associated with a loop count (e.g., 1-5) and an erase voltage. At erase operation step 562, the loop count is equal to "1" and the erase voltage is equal to an initial voltage "$V_{ER}$." At the erase operation step 563, the loop count is incremented and the erase voltage is increased to a value of "$V_{ER}+\Delta V_{ER}$."

At operation step 564, an interrupt step, the erase operation is paused and state of the erase storage operation is stored with the loop count equal to "2" and an erase voltage of "$V_{PR}+\Delta V_{PR}$." The erase storage operation resumes at operation step 565 incrementing the loop count and erase voltage from the state information previously stored (e.g., step 565 has a loop count equal to "3" and a erase voltage of "$V_{PR}+2\Delta V_{PR}$"). Subsequent erase operation step 566 and 569 increment the loop count and the erase voltage. Verify steps 568 and 570 compare a read value to an expected value to determine whether the erase operation has successfully completed. As depicted, after erase steps 566 the erase operation is again interrupted (operation step 567) by the interrupt module 304. Note that once the erase operation begins to verify the erased value, the erase operation resumes with a verify step (operation step 568). After the fifth erase step (operation step 569) the erase operation is successfully verified (e.g., via verify step 570). The erase storage operation ends with an idle step 571. Note that here the erase operation successfully completed before the interrupt module 304 paused the operation a third time.

The storage operation block diagram 580 illustrates the progress of a second erase storage operation as a plurality of operation steps 581-595. As depicted, the erase storage operation includes a verify step after each erase loop beginning with the fourth erase loop (e.g., verify steps 589, 592, and 594), the erase storage operation successfully completing (e.g., passing the verify step) after the sixth erase loop. Again, the erase storage operation is directly interrupted by the interrupt module 304 at the chip level (e.g., without a FFh command) at intervals based on the interruption frequency, for example based on an interruption parameter indicating the operation is to be suspended every two loops. Additionally, in the storage operation block diagram 580, a controller-level interrupt command (e.g., an FFh command) is received, however not from the interrupt module 304. Similar to the earlier program storage operation, the FFh command interrupts the erase operation before the ongoing erase pulse is finished, as depicted.

Operation step 581 represents an idle step, where no data is being erased from the non-volatile storage media 122. Operation steps 582-583, 585-586, 588, 590, and 593 are erase steps, each erase operation step being associated with a loop count (e.g., 1-6) and an erase voltage. At erase operation step 582, the loop count is equal to "1" and the erase voltage is equal to an initial voltage "$V_{ER}$." At the erase operation step 583, the loop count is incremented and the erase voltage is increased to a value of "$V_{ER}+\Delta V_{ER}$."

At operation step 584, an interrupt step, the interrupt module 304 pauses erase operation and the state of the erase storage operation is stored with the loop count equal to "2" and an erase voltage of "$V_{PR}+\Delta V_{PR}$." The erase storage operation resumes at operation step 585 incrementing the loop count and erase voltage from the state information previously stored (e.g., step 585 has a loop count equal to "3" and a erase voltage of "$V_{PR}+2\Delta V_{PR}$"). Erase operation step 586 also increments the loop count and erase voltage, however, the suspend command "FFh" (operation step 587) is received prior to completion of the operation step 586. Accordingly, the state of the erase storage operation is stored with the loop count equal to "4" and an erase voltage of "$V_{PR}+3\Delta V_{PR}$."

The erase storage operation resumes at operation step 588 using the state information previously stored (e.g., a loop count equal to "2" and a program voltage of "$V_{PR}+\Delta V_{PR}$"), as the operation step 586 did not complete. Subsequent program operation step 590 and 593 increment the loop count and the program voltage.

Verify steps 589, 592, and 594 compare a read value to an expected value to determine whether the erase operation has successfully completed. As depicted, after erase step 590 the erase operation is again interrupted (operation step 591) by the interrupt module 304. Note that in the depicted embodiment, the timing of interruptions by the interrupt module 304 was reset when the FFh command was received and the interrupt module 304 paused the erase operation after the operation step 590 (e.g., two loop counts after resuming from the FFh command). Also note that once the erase operation begins to verify the erased value, the erase operation resumes with a verify step (operation step 592). After the sixth erase step (operation step 593) the erase operation is successfully verified (e.g., via verify step 594). The erase storage operation ends with an idle step 595. Note that here the erase operation successfully completed before the interrupt module 304 paused the operation a third time.

Figure 6:
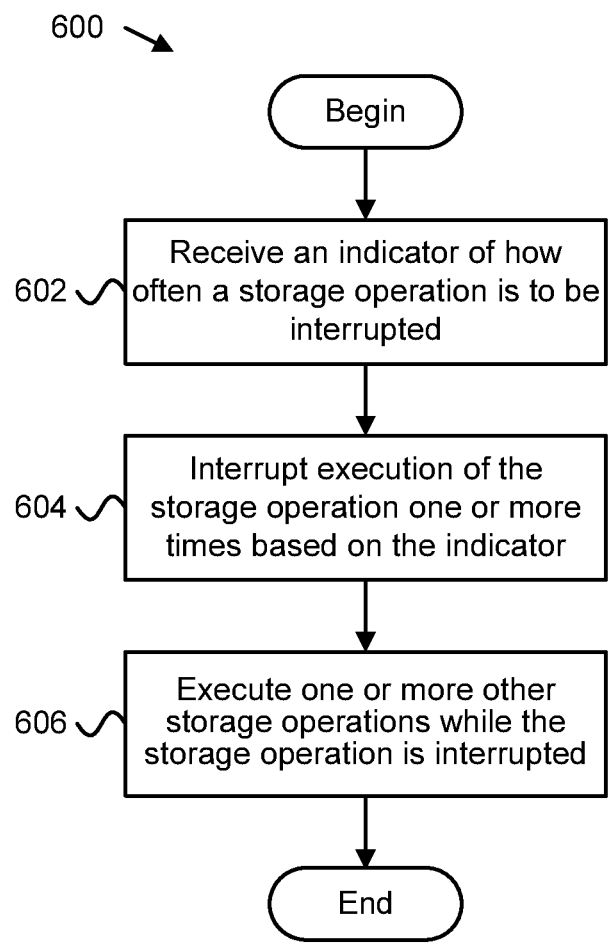
FIG. 6 is a schematic flow chart diagram illustrating one embodiment of a method for interrupting storage operations.

FIG. 6 depicts a method 600 for interrupting storage operations for consistent performance, according to embodiments of the disclosure. The method 600 begins and the interrupt module 304 receives 602 an indicator of how often a storage operation is to be interrupted. In one embodiment, the interrupt module 304 receives 602 the indicator from the frequency module 302, where the frequency module 302 determines a frequency for interrupting the storage operation. Means for receiving an indicator of how often a storage operation is to be interrupted, in various embodiments, may include a frequency module 302, a storage operation interrupt module 150, a non-volatile memory controller 124, a non-volatile memory media controller 126, an SML 130, other logic hardware, and/or other executable code stored on a computer readable storage medium. Other embodiments may include similar or equivalent means for receiving an indicator of how often a storage operation is to be interrupted.

The interrupt module 304 interrupts 604 execution of the storage operation one or more times based on the received indicator. In one embodiment, interrupting 604 execution of the storage operation includes the interrupt module 304 pausing the storage operation according to the determined frequency. Means for interrupting execution of the storage operation one or more times based on the received indicator, in various embodiments, may include a interrupt module 304, a storage operation interrupt module 150, a non-volatile memory controller 124, a non-volatile memory media controller 126, an SML 130, other logic hardware, and/or other executable code stored on a computer readable storage medium. Other embodiments may include similar or equivalent means for interrupting execution of the storage operation one or more times based on the received indicator.

The intervening operation module 404 executes 606 one or more other storage operations on the storage element while the storage operation is interrupted. The method 600 ends. In some embodiments, the intervening operation module 404 executes 606 up to a threshold number of intervening storage operations while the storage operation is interrupted. Means for executing one or more other storage operations while the storage operation is interrupted, in various embodiments, may include a intervening operation module 404, a storage operation interrupt module 150, a non-volatile memory controller 124, a non-volatile memory media controller 126, an SML 130, other logic hardware, and/or other executable code stored on a computer readable storage medium. Other embodiments may include similar or equivalent means for executing up to a threshold number of intervening storage operations while the storage operation is interrupted.

Figure 7:
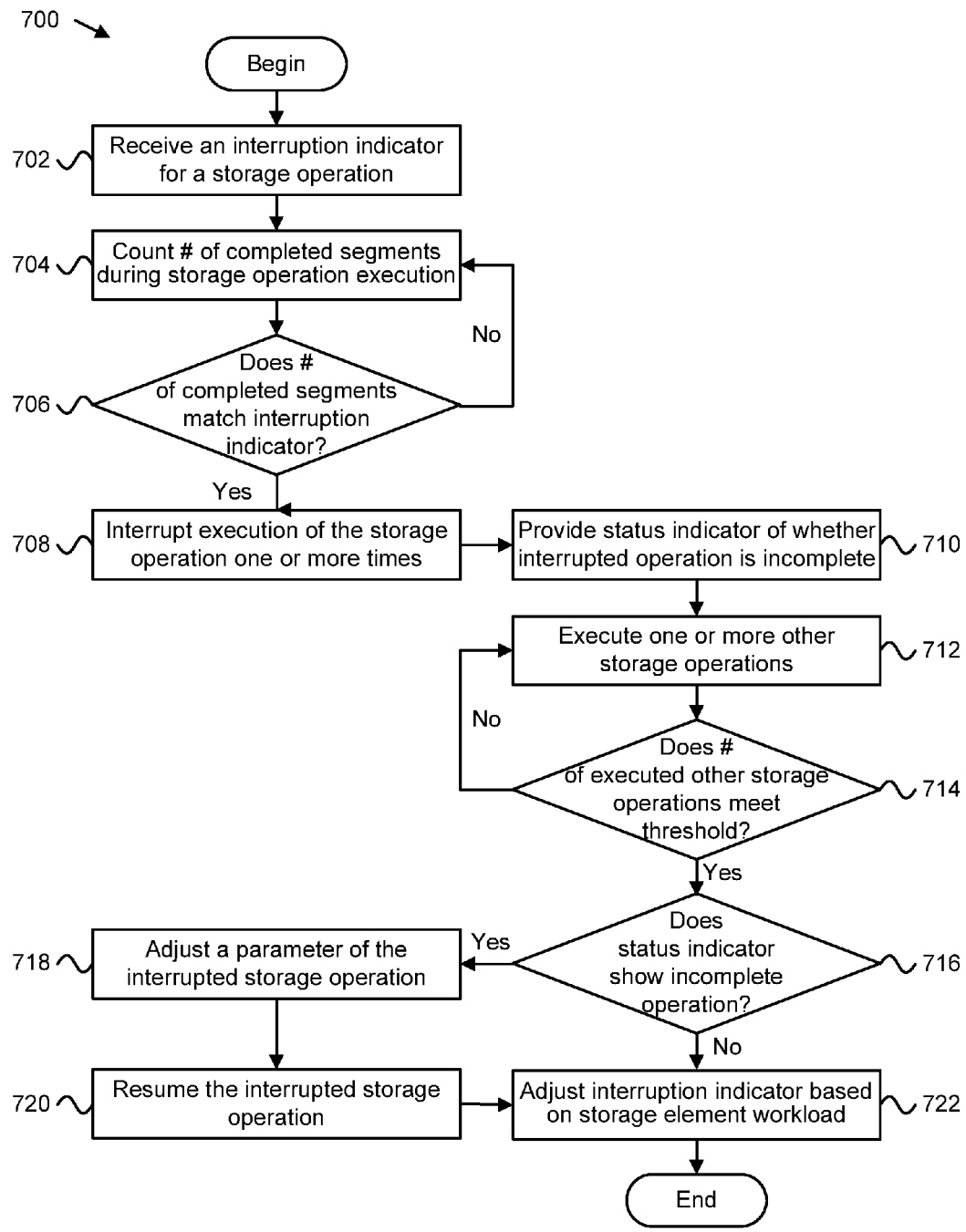
FIG. 7 is a schematic flow chart diagram illustrating a further embodiment of a method for interrupting storage operations.

FIG. 7 depicts a method 700 for interrupting storage operations for consistent performance, according to embodiment of the disclosure. The method 700 begins and the interrupt module 304 receives 702 an interrupt indicator of how often a storage operation is to be interrupted. In one embodiment, the interrupt module 304 receives 702 the interrupt indicator from the frequency module 302, and the frequency module 302 determines a frequency for interrupting the storage operation. Means for receiving an interrupt indicator of how often a storage operation is to be interrupted, in various embodiments, may include a frequency module 302, a storage operation interrupt module 150, a non-volatile memory controller 124, a non-volatile memory media controller 126, an SML 130, other logic hardware, and/or other executable code stored on a computer readable storage medium. Other embodiments may include similar or equivalent means for receiving an indicator of how often a storage operation is to be interrupted.

The counter module 408 counts 704 the number of completed storage operation segments during execution of the storage operation. Means for counting the number of completed storage operation segments during execution of the storage operation, in various embodiments, may include a interrupt module 304, a resume module 306, an intervening operation module 404, a counter module 408, a storage operation interrupt module 150, a non-volatile memory controller 124, a non-volatile memory media controller 126, an SML 130, other logic hardware, and/or other executable code stored on a computer readable storage medium. Other embodiments may include similar or equivalent means for counting the number of completed storage operation segments during execution of the storage operation.

The counter module 408 determines 706 whether the number of completed segments match an expected number of segments of the storage operation to be executed between interruptions based on the interrupt indicator. In one embodiment, the frequency module 302 determines a segment length based on the interrupt indicator, and the segment length indicates an expected number of segments of the storage operation to be executed between interruptions. Means for determining whether the number of completed segments match an expected number of segments of the storage operation to be executed between interruptions based on the interrupt indicator, in various embodiments, may include a interrupt module 304, a counter module 408, a threshold module 412, a storage operation interrupt module 150, a non-volatile memory controller 124, a non-volatile memory media controller 126, an SML 130, other logic hardware, and/or other executable code stored on a computer readable storage medium. Other embodiments may include similar or equivalent means for determining whether the number of completed segments match an expected number of segments of the storage operation to be executed between interruptions based on the interrupt indicator.

If the number of completed segments does not match the expected number of segments based on the interrupt indicator, then the counter module 408 continues to count 704 the number of completed segments during execution of the storage operation. Otherwise, if the number of completed segments matches the expected number of segments based on the interrupt indicator, the interrupt module 304 interrupts 708 execution of the storage operation one or more times.

In certain embodiments, interrupting 708 execution of the storage operation includes the operation state module 410 storing state information relating to the interrupted storage operation. The state information, in one embodiment, may include a last completed programming step or erase step within the storage operation prior to interrupting the storage operation. Means for interrupting execution of the storage operation one or more times based on the received indicator, in various embodiments, may include a interrupt module 304, a storage operation interrupt module 150, a non-volatile memory controller 124, a non-volatile memory media controller 126, an SML 130, other logic hardware, and/or other executable code stored on a computer readable storage medium. Other embodiments may include similar or equivalent means for interrupting execution of the storage operation one or more times based on the received indicator.

The interrupt module 304 provides 710 a status indicator of whether the interrupted storage operation is in an incomplete state. In some embodiments, providing 710 the status indicator includes setting a bit value in a register associated with the interrupted storage operation. The register associated with the interrupted storage operation, in one embodiment, may be located on the memory die where the interrupted storage operation was executing. Means for providing a status indicator of whether the interrupted storage operation is in an incomplete state, in various embodiments, may include a interrupt module 304, an operation state module 410, a storage operation interrupt module 150, a non-volatile memory controller 124, a non-volatile memory media controller 126, an SML 130, other logic hardware, and/or other executable code stored on a computer readable storage medium. Other embodiments may include similar or equivalent means for providing a status indicator of whether the interrupted storage operation is in an incomplete state.

The intervening operation module 404 executes 712 one or more other storage operations on the storage element while the storage operation is interrupted. In some embodiments, the counter module 408 tracks the amount of other (intervening) storage operations executed 712 on the storage device while the storage operation is interrupted. Means for executing one or more other storage operations while the storage operation is interrupted, in various embodiments, may include a intervening operation module 404, a storage operation interrupt module 150, a non-volatile memory controller 124, a non-volatile memory media controller 126, an SML 130, other logic hardware, and/or other executable code stored on a computer readable storage medium. Other embodiments may include similar or equivalent means for executing up to a threshold number of intervening storage operations while the storage operation is interrupted.

The counter module 408 determines 714 whether the number of executed other storage operations is equal to a predetermined number intervening operations (e.g., an intervening operation threshold). Means for determining whether the number of executed other storage operations is equal to a predetermined number intervening operations, in various embodiments, may include a resume module 306, an intervening operation module 404, a counter module 408, a threshold module 412, a storage operation interrupt module 150, a non-volatile memory controller 124, a non-volatile memory media controller 126, an SML 130, other logic hardware, and/or other executable code stored on a computer readable storage medium. Other embodiments may include similar or equivalent means for determining whether the number of executed other storage operations is equal to a predetermined number intervening operations.

If the number of executed other storage operations does not equal the predetermined number, then the intervening operation module 404 executes 712 one or more other storage operations on the storage element. Otherwise, if the number of executed other storage operations equals the predetermined number, then the resume module 306 determines 716 whether the status indicator shows that the interrupted storage operation is in the incomplete state.

In some embodiments, determining 716 whether the status indicator shows the interrupted storage operation to be incomplete includes reading a bit value from a register storing state information relating to the interrupted storage operation. Means for determining whether the status indicator shows that the interrupted storage operation is in the incomplete state, in various embodiments, may include a resume module 306, an operation state module 410, a storage operation interrupt module 150, a non-volatile memory controller 124, a non-volatile memory media controller 126, an SML 130, other logic hardware, and/or other executable code stored on a computer readable storage medium. Other embodiments may include similar or equivalent means for determining whether the status indicator shows that the interrupted storage operation is in the incomplete state.

If the interrupted storage operation is in the incomplete state, then the adjustment module 406 adjusts 718 a parameter of the interrupted storage operation, the resume module 306 resumes 720 the interrupted storage operation, and the workload module 402 adjusts 722 the interrupt indicator based on workload of the storage element. Otherwise, if the interrupted storage operation is in a completed state, then the workload module 402 adjusts 722 the interrupt indicator based on the storage element workload.

In some embodiments, adjusting 718 a parameter of the interrupted storage operation includes adjusting one or more of an initial voltage, a voltage step, a number of steps, and a step duration of the interrupted storage operation. In one embodiment, the adjustment module 406 adjusts 718 one or more parameters of the interrupted storage operation to extend or lengthen the overall operation time the remaining portion of the interrupted storage operation (e.g., as compared to an unadjusted storage operation of the same type). In another embodiment, the adjustment module 406 adjusts 718 one or more parameters the interrupted storage operation to meet the quality of service requirement for the storage operations of the same type as the interrupted storage operation. Means for adjusting a parameter of the interrupted storage operation, in various embodiments, may include an adjustment module 406, a storage operation interrupt module 150, a non-volatile memory controller 124, a non-volatile memory media controller 126, an SML 130, other logic hardware, and/or other executable code stored on a computer readable storage medium. Other embodiments may include similar or equivalent means for adjusting a parameter of the interrupted storage operation.

In some embodiments, resuming 720 the interrupted storage operation includes retrieving state information for the interrupted storage operation. In one embodiment, resuming 720 the interrupted storage operation includes continuing the interrupted storage operation at the point (e.g., step, segment, loop, pulse) where the storage operation was interrupted. In another embodiment, resuming some 20 intrepid storage operation includes restarting the interrupted storage operation at a beginning point storage operation. In certain embodiments, resuming 720 the interrupted storage operation includes performing a verify step, or operation, before applying a voltage as part of the storage operation (e.g., a program storage operation or an erase storage operation). Means for resuming the interrupted storage operation, in various embodiments, may include a resume module 306, a storage operation interrupt module 150, a non-volatile memory controller 124, a non-volatile memory media controller 126, an SML 130, other logic hardware, and/or other executable code stored on a computer readable storage medium. Other embodiments may include similar or equivalent means for resuming the interrupted storage operation.

In some embodiments, adjusting 722 the interrupt indicator based on the storage element workload includes the workload module 402 monitoring a number of read operations and a number of non-read storage operations (e.g., program operations and/or erase operations) and determining a workload ratio comprising the ratio of read operations to non-read operations, and an interrupt indicator for one or more subsequent storage operations may be based on the workload ratio. Means for adjusting the interrupt indicator based on workload of the storage element, in various embodiments, may include a workload module 402, a storage operation interrupt module 150, a non-volatile memory controller 124, a non-volatile memory media controller 126, an SML 130, other logic hardware, and/or other executable code stored on a computer readable storage medium. Other embodiments may include similar or equivalent means for adjusting the interrupt indicator based on workload of the storage element.

While many embodiments are described herein, at least some of the described embodiments facilitate program suspend/resume operations and erase suspend/resume operations for an electronic storage device. In other words, a programming operation or erase operation (or other equivalent) that is being processed at non-volatile memory device 120 may be suspended, either temporarily or permanently, in order to allow one or more other memory access operations (e.g., read, partial program, partial erase, etc.) to be processed at the non-volatile memory device 120.

As used herein, the term "program operation" includes any storage operation to persist a value (digital or analog), or to persist a state which represents a value, on the non-volatile memory device 120. Some examples of other program (or equivalent) operations include, but are not limited to, burning, storing, writing, and setting a persistent value on the non-volatile memory device 120. References herein to a program operation are inclusive of other equivalent or similar operations. As used herein, the term "erase operation" includes any storage operation to remove a value (digital or analog), or to reset a state which represents a value, on the non-volatile memory device 120. References herein to an erase operation are inclusive of other equivalent or similar operations.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
   receiving, at a storage element, an indicator of a frequency for interrupting a storage operation;
   interrupting execution of the storage operation one or more times based on the indicator, without receiving a suspend command from an external controller, by way of logic within the storage element; and
   executing one or more other storage operations on the storage element while the storage operation is interrupted, each of the one or more other storage operations having a shorter duration than the storage operation.

2. The method of claim 1, further comprising automatically resuming, by the storage element, the interrupted storage operation in response to completing the one or more other storage operations.

3. The method of claim 2, wherein executing the one or more other storage operations on the storage element comprises executing up to a predetermined number of operations and automatically resuming the interrupted storage operation is in response to completion of the predetermined number of operations.

4. The method of claim 2, wherein automatically resuming the interrupted storage operation comprises:
   initiating a timer, in response to interrupting execution of the storage operation; and
   resuming the interrupted storage operation in response to expiration of the timer.

5. The method of claim 1, further comprising resuming the interrupted storage operation in response to receiving a resume command at the storage element.

6. The method of claim 1, further comprising:
   providing a status indicator of whether the interrupted storage operation is in an incomplete state; and
   accepting a command to resume the interrupted storage operation in response to the status indicator indicating that the interrupted storage operation is in the incomplete state.

7. The method of claim 1, further comprising setting a total number of erase pulses for the interrupted storage operation to be more than a total number of erase pulses for an uninterrupted storage operation of a same type as the interrupted storage operation.

8. The method of claim 1, further comprising setting a voltage step between pulses of the interrupted storage operation to be smaller than a voltage step between pulses of an uninterrupted storage operation of a same type as the interrupted storage operation.

9. The method of claim 1, further comprising:
   determining a number of segments of the storage operation to execute between interruptions based on the indicator;
   counting, a number of completed segments during execution of the storage operation; and
   determining to interrupt execution of the storage operation from within the storage element in response to the number of completed segments satisfying the determined number of segments.

10. The method of claim 1, further comprising:
    monitoring a workload for the storage element, the workload comprising a number of read storage operations and a number of program storage operations;
    determining a workload ratio of the read storage operations and the program storage operations; and
    adjusting the indicator for a subsequent storage operation based on the workload ratio.

11. The method of claim 10, further comprising determining an average program operation time for the storage element, wherein the indicator is based on the workload ratio and the average program operation time.

12. The method of claim 10, wherein adjusting the indicator comprises decreasing how often the subsequent storage operation is to be interrupted as a percentage of the program storage operations in the workload ratio increases.

13. The method of claim 1, wherein the one or more other storage operations comprise uninterruptable storage operations.

14. An apparatus comprising:
    an integrated circuit chip comprising non-volatile memory, the integrated circuit chip configured to,
    determine a frequency for pausing a storage operation;
    pause execution of the storage operation from within the integrated circuit chip according to the determined frequency;
    execute one or more other storage operations on the integrated circuit chip while the storage operation is paused, each of the one or more other storage operations having a shorter duration than the storage operation; and
    continue the paused storage operation in response to a trigger.

15. The apparatus of claim 14, the integrated circuit chip further configured to monitor a workload of a non-volatile memory device comprising the non-volatile memory element, wherein the integrated circuit chip adjusts the frequency for pausing the storage operation based on the workload.

16. The apparatus of claim 14, wherein the integrated circuit chip is configured to determine the frequency for pausing the storage operation based on an indicator received from one or more of a controller for the non-volatile memory element and a storage client.

17. The apparatus of claim 14, wherein the trigger comprises one or more of receiving a resume request, satisfying a time threshold since pausing execution, and executing a threshold number of other operations on the apparatus while the storage operation is paused.

18. A system comprising:
- a plurality of data recording elements, each data recording element configured to interrupt a storage operation from within the respective data recording element based on an indicator of a frequency for interrupting the storage operation; and
- a controller for the plurality of data recording elements, the controller monitoring a workload of storage requests for the data recording elements, determining a frequency for interrupting the storage operation before checking for insertable storage operations based on the monitored workload, sending the indicator of the frequency for interrupting the storage operation to one or more of the plurality of data recording elements, checking for insertable storage operations for one or more of the data, recording elements based on the determined frequency for interrupting the storage operation, and instructing the plurality of data recording elements to execute one or more insertable storage operations while the storage operation is interrupted, each of the one or more insertable storage operations having a shorter duration than the storage operation.

19. The system of claim 18, wherein the controller determines an average program operation time and determines the frequency for interrupting the storage operation based on the monitored workload and the average program operation time.

20. The system of claim 18, wherein the controller decreases the frequency for interrupting the storage operation as a percentage of program storage operations in the workload increases.

* * * * *